(12) United States Patent
Glyer et al.

(10) Patent No.: US 11,949,692 B1
(45) Date of Patent: *Apr. 2, 2024

(54) METHOD AND SYSTEM FOR EFFICIENT CYBERSECURITY ANALYSIS OF ENDPOINT EVENTS

(71) Applicant: Google LLC, Mountain View, CA (US)

(72) Inventors: Christopher Glyer, Arlington, CA (US); Seth Jesse Summersett, Hathway Pines, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,634

(22) Filed: May 10, 2021

Related U.S. Application Data

(63) Continuation of application No. 15/857,467, filed on Dec. 28, 2017, now Pat. No. 11,005,860.

(51) Int. Cl.
  *H04L 9/40* (2022.01)
  *H04L 43/12* (2022.01)

(52) U.S. Cl.
  CPC .......... *H04L 63/1416* (2013.01); *H04L 43/12* (2013.01); *H04L 63/1433* (2013.01); *H04L 2463/121* (2013.01)

(58) Field of Classification Search
  CPC . H04L 63/1416; H04L 43/12; H04L 63/1433; H04L 2463/121
  See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.-mining.pdf-.

(Continued)

*Primary Examiner* — Beemnet W Dada
(74) *Attorney, Agent, or Firm* — Dority & Manning P.A.

(57) ABSTRACT

A comprehensive cybersecurity platform includes a cybersecurity intelligence hub, a cybersecurity sensor and one or more endpoints communicatively coupled to the cybersecurity sensor, where the platform allows for efficient scaling, analysis, and detection of malware and/or malicious activity. An endpoint includes a local data store and an agent that monitors for one or more types of events being performed on the endpoint, and performs deduplication within the local data store to identify "distinct" events. The agent provides the collected metadata of distinct events to the cybersecurity sensor which also performs deduplication within a local data store. The cybersecurity sensor sends all distinct events and/or file objects to a cybersecurity intelligence hub for analysis. The cybersecurity intelligence hub is coupled to a data management and analytics engine (DMAE) that analyzes the event and/or object using multiple services to render a verdict (e.g., benign or malicious) and issues an alert.

20 Claims, 10 Drawing Sheets

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |

(56) References Cited

U.S. PATENT DOCUMENTS

| | | |
|---|---|---|
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |

(56) References Cited

U.S. PATENT DOCUMENTS

| | | |
|---|---|---|
| 9,946,568 B1 | 4/2018 | Smael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,623,429 B1 * | 4/2020 | Vines .................. H04L 43/0882 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Achman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |

(56) References Cited

U.S. PATENT DOCUMENTS

| | | |
|---|---|---|
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0245417 A1 | 10/2007 | Lee et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |

(56) References Cited

U.S. PATENT DOCUMENTS

| | | |
|---|---|---|
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2015/0373043 A1* | 12/2015 | Wang ............... G06F 21/6254 706/12 |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0115574 A1 | 4/2018 | Ridley |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.sp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "Extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.

(56) References Cited

OTHER PUBLICATIONS

Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al., Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Placek, and Timothy N. Newsham, "Insertion, Evasion, and Denial of Service: Eluding Network Intrusion Detection", Secure Networks, ("Ptacek"), (Jan. 1998).
U.S. Appl. No. 15/857,467, filed Dec. 28, 2017 Advisory Action dated Aug. 13, 2020.
U.S. Appl. No. 15/857,467, filed Dec. 28, 2017 Final Office Action dated May 29, 2020.
U.S. Appl. No. 15/857,467, filed Dec. 28, 2017 Non-Final Office Action dated Nov. 15, 2019.
U.S. Appl. No. 15/857,467, filed Dec. 28, 2017 Non-Final Office Action dated Sep. 22, 2020.
U.S. Appl. No. 15/857,467, filed Dec. 28, 2017 Notice of Allowance dated Jan. 6, 2021.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

METHOD AND SYSTEM FOR EFFICIENT CYBERSECURITY ANALYSIS OF ENDPOINT EVENTS

CROSS REFERENCE TO RELATED APPLICATIONS

This application is a continuation of U.S. patent application Ser. No. 15/857,467 filed Dec. 28, 2017, now U.S. Pat. No. 11,003,773, issued May 11, 2021, the entire contents of which is incorporated herein by reference.

FIELD

Embodiments of the disclosure relate to the field of cybersecurity. More specifically, one embodiment of the disclosure relates to a comprehensive cybersecurity platform for processing events observed during run-time at endpoints.

GENERAL BACKGROUND

Cybersecurity attacks have become a pervasive problem for organizations as many networked devices and other resources have been subjected to attack and compromised. A cyber-attack constitutes a threat to security arising out of stored or in-transit data which, for example, may involve the infiltration of any type of content, such as software for example, onto a network device with the intent to perpetrate malicious or criminal activity or even a nation-state attack (i.e., "malware").

Over the years, companies have deployed many different approaches directed to network-based, malware protection services. One conventional approach involves the placement of malware detection devices throughout an enterprise network (or subnetwork), including the installation of cybersecurity agents (hereinafter, "agents"). Operating within an endpoint, an agent is responsible for monitoring and locally storing selected events. Herein, the "event" includes a task or activity that is conducted by a software component running on the endpoint and, in some situations, the activity may be undesired or unexpected indicating a cyber-attack is being attempted, such as a file being written to disk, a process being executed or created, or an attempted network connection.

A tremendous amount of information would be available to cybersecurity analysts in their attempts to identify cyber-attacks by collecting and analyzing the monitored events occurring at each endpoint (i.e., physical or virtual device). While the vast amount of information may seem valuable from a cybersecurity analysis perspective, conventional cybersecurity deployment schemes for analyzing monitored events, especially for a network environment having thousands or even hundreds of thousands of endpoints, are incapable of being effectively (or efficiently) scaled to handle this large quantity of information. One reason for this scaling problem is due, at least in part, to reliance on agents in accurately identifying "malicious" objects (and/or events), especially when the agents feature performance constraints (e.g., limited processing power and/or analysis time) and given their results are extremely noisy (i.e., produce large numbers of false positives).

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
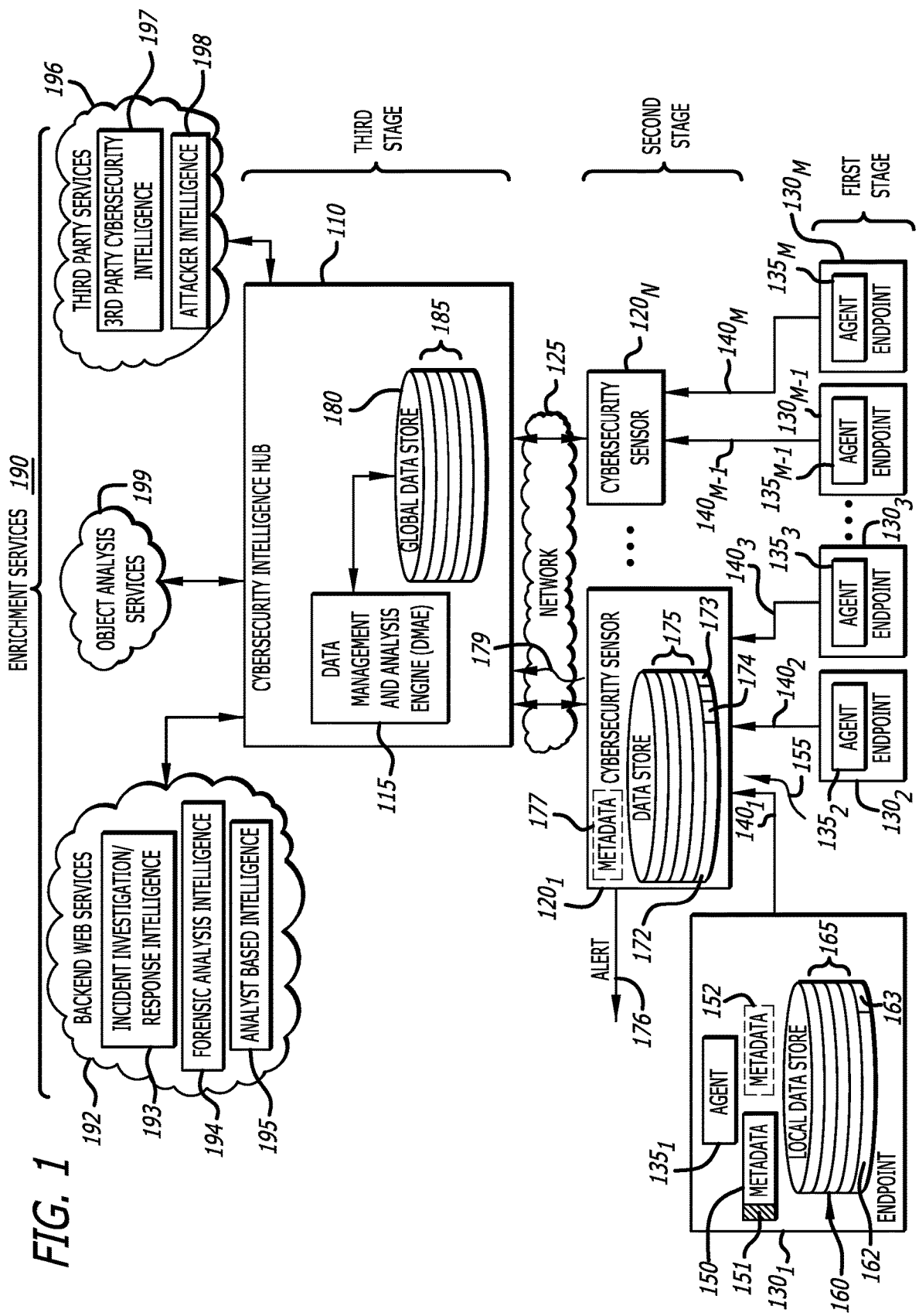
FIG. 1 is a block diagram of an exemplary embodiment of a comprehensive cybersecurity platform.

Embodiments of the present disclosure generally relate to a comprehensive cybersecurity platform featuring multiple stages in propagating cybersecurity intelligence from an endpoint (e.g., laptop or server) to a cybersecurity intelligence hub located as a public or private cloud-based service. One example of the comprehensive cybersecurity platform includes endpoints (first stage); cybersecurity sensors (second stage) that may support any number of endpoints (e.g., tens or hundreds), and a cybersecurity intelligence hub (third stage) that may support any number of sensors (e.g., tens or hundreds) and enhanced services (described below). Hence, the comprehensive cybersecurity platform is configured to support a cybersecurity intelligence workflow where multiple (two or more) stages apply deduplication controls in the transmission of cybersecurity intelligence collected at the endpoints to the cybersecurity intelligence hub. The "nested" deduplication controls are designed to improve the speed and accuracy in determining classifications of an event while, at the same time, reducing overall network throughput requirements and mitigate repetitive analytics on identical events. This allows for better platform scalability without adversely affecting the currency or relevancy of stored metadata within the cybersecurity intelligence hub (referred to as "hub-stored metadata").

For purposes of consistency in terminology, as used herein, a "distinct event" includes a task or activity that has not been previously observed; namely, there is currently no matching (i.e. identical or highly correlated) recorded observation of (i) a particular event in a local data store by an agent performing an assessment from a local perspective (first stage), (ii) a particular event in a data store (provided from multiple agents supported by the sensor) by a cybersecurity sensor performing a broader assessment such as from an enterprise perspective (second stage), or a particular event in a global data store (provided from multiple agents and sensors supported by the hub) by a cybersecurity intelligence hub performing an assessment from a platform-wide perspective (third stage). For some events, such as a logon event for example, the distinct event may exclude certain parameters that are not required for cybersecurity analysis, and in some cases, may obfuscate the distinct nature of events (e.g., logon event with particular typed password excluded from the event, personal identification information "PII", etc.). The reason is that, for certain events, the content may be less important than the number of attempts being made. "Distinctive metadata" is a portion of collected metadata associated with a monitored event that may be used to distinguish and identify the monitored event from other events.

As described below, each endpoint includes an agent that is configured to control submissions of metadata associated with monitored events through a first deduplication analysis. More specifically, an agent is configured to provide metadata collected for a monitored event (collected metadata) to a cybersecurity sensor when the agent considers that this monitored event is "distinct" (e.g., currently no recorded observation of a particular event). One technique for determining whether the monitored event is categorized as "distinct" involves a comparison of a portion of the collected metadata that differentiates the monitored event from other events of similar type (hereinafter referred to as the "distinctive metadata") to metadata currently stored within a local (e.g., on-board) data store utilized by the agent (referred to as "endpoint-stored metadata"). The prescribed storage (caching) policy, which may be directed to a duration in storage of metadata maintained by the local data store, may impact the categorization of a monitored event as "distinct."

Upon determining that the monitored event is "distinct," the agent stores at least the collected metadata (and optionally additional metadata as described below) into its local data store and provides at least the collected metadata to the cybersecurity sensor. Otherwise, for a detected benign monitored event, the agent may forego providing the collected metadata to the cybersecurity sensor and merely record the occurrence of the event (e.g., change a count maintained for an entry of the endpoint's local data store that represents the number of detected events corresponding to a prior evaluated event represented by endpoint-stored metadata within the entry). For a malicious event, the agent or the cybersecurity sensor may handle reporting and/or taking other preventive or remediation action on the malicious event and/or provided metadata from its local data store, a cybersecurity sensor and/or the cybersecurity intelligence hub if made available of the endpoint after other stage analyses.

After receipt of the collected metadata from the agent, the cybersecurity sensor conducts a second deduplication analysis based, at least in part, on the distinctive metadata to determine whether the monitored event is categorized as "distinct" across all endpoints supported by the sensor or "indistinct" (e.g., prior observation of the particular event). For "indistinct" events, the distinctive metadata represents the monitored event matches metadata representing a prior evaluated event stored within a data store of the sensor and received from any of a plurality of agents, and in some embodiments, the cybersecurity intelligence hub, and/or the enhanced services (referred to as "sensor-stored metadata"). Where a malicious verdict is recovered from the matching sensor-based metadata, the cybersecurity sensor may issue or otherwise initiate an alert, which may include a message sent to administrator (e.g., text, email, audio, etc.) or a report (e.g., represent a malicious verdict on a dashboard screen by a graph, image or illuminating a portion of the dashboard screen to denote a malicious event). The alert may be enriched with metadata from multiple sources (described above). The cybersecurity sensor may perform other remediation and/or analytics as well. Otherwise, for a detected benign monitored event, the cybersecurity sensor may forego providing the collected metadata to the cybersecurity intelligence hub and merely record the occurrence of the event (e.g., store the metadata provided by the agent and change a count maintained for an entry of the cybersecurity sensor's data store that represents the number of detected events), as described below.

Upon determining that the monitored event is "distinct" across all of the endpoints supported by the cybersecurity sensor, the cybersecurity sensor stores at least the collected metadata into the sensor's data store and provides at least the collected metadata to the cybersecurity intelligence hub to conduct another deduplication analysis as described above, this time across all cybersecurity sensors supported by the hub. When the collected metadata is made available to the cybersecurity intelligence hub and the monitored event is categorized as "distinct" across all of the sensors communicatively coupled to the cybersecurity intelligence hub, the cybersecurity intelligence hub may solicit the assistance of backend or third party services (described below) to determine a verdict for the monitored event. Being now added as part of the hub-stored metadata, the collected metadata (and perhaps additional metadata accompanying the collected metadata) provides additional cybersecurity intelligence that may be relied upon by authorized users within the comprehensive cybersecurity platform.

One significant aspect of the invention is controlling conveyance of the vast amount of cybersecurity intelligence collected by endpoints to a global data store of the cybersecurity intelligence hub through a deduplication-based, metadata submission scheme. According to the comprehensive cybersecurity platform described herein, the cybersecurity hub supports malware detection on a global perspective based on received cybersecurity intelligence from all endpoints and sensors at a system-wide level along with cybersecurity intelligence from the enhanced services. Similarly, but on a smaller scale, each cybersecurity sensor supports malware detection on a local perspective, aggregating and providing low-latency classifications (normally in a few seconds) as well as analytic support for a selected group of agents. Lastly, each agent within an endpoint may support specific, localized malware detection.

Besides metadata being sourced at the endpoints, the global data store may receive cybersecurity intelligence from other cybersecurity intelligence sources. Collectively, the "cybersecurity intelligence" includes metadata associated with events previously determined to be of a benign, malicious, or unknown (e.g., not previously analyzed or inconclusive) classification. This metadata may be accessed as part of malware detection analyses by any number of authorized customers in efforts to provide more rapid malicious object detection, quicken the issuance (or initiate issuance) of alerts to hasten other remedial action, increased accuracy in cyber-attack detection, and increased visibility and predictability of cyber-attacks, their proliferation, and the extent or spread of infection.

I. Detailed Overview

For this embodiment of the disclosure, the comprehensive cybersecurity platform includes the cybersecurity intelligence hub communicatively coupled to cybersecurity intelligence sources and/or cybersecurity sensors each operating as both a source and consumer of cybersecurity intelligence. Herein, the cybersecurity intelligence hub may operate as (i) a central facility connected via a network to receive metadata from one or more cybersecurity intelligence sources; (ii) an intelligence analytics resource to analyze metadata received directly or indirectly by agents, and store the analysis results and/or classification (verdict) with the collected metadata (or cross-referenced with the collected metadata); and (iii) a central facility serving as a distribution point for the hub-stored metadata via a network. In a centralized deployment, the cybersecurity intelligence hub may be deployed as a dedicated system or as part of cloud-based malware detection service (e.g., as part of, or complementary to and interacting with a cybersecurity detection system and service described in detail in U.S. patent application Ser. No. 15/283,126 entitled "System and Method For Managing Formation and Modification of a Cluster Within a Malware Detection System," filed Sep. 30, 2016; U.S. patent application Ser. No. 15/721,630 entitled "Multi-Level Control For Enhanced Resource and Object Evaluation Management of Malware Detection System," filed Sep. 29, 2017, the entire contents of both of these applications are incorporated by reference herein).

Herein, the cybersecurity intelligence hub includes a global data store communicatively coupled to a data management and analytics engine (DMAE). The global data store operates as a database or repository to receive and store cybersecurity intelligence, including metadata associated with events received from multiple (two or more) agents. According to one embodiment of the disclosure, these events may include (i) events previously analyzed and determined to be of a malicious or benign classification, (ii) events previously analyzed without conclusive results and currently determined to be of an "unknown" classification, and/or (iii) events previously not analyzed (or awaiting analysis), and thus of an "unknown" classification. In general terms, the global data store contains the entire stockpile of cybersecurity intelligence collected and used by individuals, businesses, and/or government agencies (collectively, "customers"), which may be continuously updated by the various intelligence sources and by the DMAE to maintain its currency and relevancy. The global data store may be implemented across customers of a particular product and/or service vendor or across customers of many such vendors.

Herein, the stored cybersecurity intelligence within the global data store may include metadata associated with "distinct" events (e.g., not recorded as previously observed within the global data store), gathered from a variety of disparate cybersecurity sources. One of these sources may include a cybersecurity sensor, which may be located on a network (or subnetwork) such as at a periphery of the network (or subnetwork), proximate to an email server remotely located from the cybersecurity intelligence hub, or the like.

In general, a "cybersecurity sensor" may correspond to a physical network device or a virtual network device (software) that aggregates and/or correlates events, as well as assisting in the detection of malicious events and providing alert messages (notifications via logic) in response to such detection. The cybersecurity sensor may include (or utilize external from the sensor) a data store for storage of metadata associated with prior evaluated events (sensor-stored metadata). The cybersecurity sensor may also include (i) deduplication logic to control propagation of cybersecurity intelligence (e.g., metadata) to the cybersecurity intelligence hub; (ii) metadata parsing logic to parse the collected metadata sourced by an agent from other information in the incoming submission (e.g., messages), (iii) metadata inspection logic to inspect the collected metadata against the sensor-stored metadata, (iv) metadata management logic to maintain a database mapping entries for the sensor-stored metadata to their corresponding sources, and (v) count incrementing logic to set a count associated with an entry that represents a number of times this specific metadata has been detected over a prescribed time window (e.g., ranging from a few seconds or minutes to years).

As described in detail below, one or more endpoints may be communicatively coupled to a cybersecurity sensor. According to one embodiment of the disclosure, an endpoint is a physical network device equipped with an "agent" to monitor and capture events in real-time for cybersecurity investigation or malware detection. Alternatively, according to one embodiment of the disclosure, an endpoint may be a virtual network device being software that processes information such as a virtual machine or any other virtualized resource. The agent may be deployed and operate as part of the endpoint.

According to one embodiment of the disclosure, the agent is software running on the endpoint that monitors for and detects one or more events. Some of these monitored events may be categorized as execution events, network events, and/or operation events. An example of an "execution event" may involve an activity performed by a process (e.g., open file, close file, create file, write to file, create new process, etc.) running on the endpoint while an example of a "network event" may involve an attempted or successful network connection conducted by endpoint logic. An example of an "operation event" may include an attempted or successful operation performed on the endpoint such as a Domain Name System (DNS) lookup or a logon or logoff operation directed to an access controlled system.

Upon detecting a monitored event, the agent collects (i.e., gathers and/or generates) metadata associated with the monitored event. It is contemplated that the type of monitored event may determine, at least in part, the distinctive metadata that is needed to differentiate the monitored event from other events of similar type. Thereafter, the agent conducts an analysis of the monitored event to determine whether or not the monitored event is "distinct" as described above. For example, according to one embodiment of the disclosure, this analysis may include the agent determining whether the distinctive metadata associated with the monitored event, being part of the collected metadata, is currently part of the endpoint-stored metadata (i.e., stored in the endpoint's local data store). This local data store is responsible for maintaining metadata associated with prior evaluated events in accordance with a prescribed storage (caching) policy (e.g., cache validation policy). The prescribed (caching) policy, which can be directed to a duration of storage of metadata, may impact the categorization as to which monitored events occurring within the endpoint are "distinct." Examples of the potential effects in categorization are described below.

Accordingly to one embodiment of the disclosure, the deduplication logic determines whether the distinctive metadata matches any endpoint-stored metadata residing in the endpoint's local data store governed by its prescribed storage policy. Of course, it is contemplated that, where the agent local data store includes multiple (two or more) local data stores, each with a different prescribed storage policy, the agent would need to compare the distinctive metadata to metadata stored in each data store according to its particular storage policy.

If no portion of the endpoint-based metadata matches the distinctive metadata representing the monitored event (i.e., the monitored event is "distinct"), the agent may be configured to supply the collected metadata to the cybersecurity sensor by a "push" or "pull" delivery scheme, described below. Thereafter, the agent generates the submission, including the collected metadata described below, which is provided to the cybersecurity sensor.

However, if a portion of the endpoint-stored metadata matches the distinctive metadata (i.e., the monitored event is "indistinct"), where some parameters of the event may be excluded prior to evaluation (e.g. a logon event), the agent may increment a count corresponding to the number of occurrences this specific metadata (e.g., for execution events, etc.) or specific type of metadata (e.g., for network events, etc.) has been detected by the agent. It is contemplated that, as the count increases and exceeds a prescribed threshold over a prescribed time window, the agent may circumvent its findings and identify the monitored event correspond to the collected metadata as "distinct" in order to potentially force another analysis of the monitored event.

It is further contemplated that, upon collecting the metadata, a timestamp may be generated and added as part of the collected metadata for the monitored event. The timestamp allows for the removal of "stale" metadata retained in the local data store of the endpoint longer than a prescribed period of time and provides an indexing parameter for a data store lookup.

After receipt of the submission, the cybersecurity sensor extracts at least the collected metadata and determines whether the monitored event is "distinct." For example, according to one embodiment of the disclosure, the cybersecurity sensor determines whether the distinctive metadata of the collected metadata matches one or more portions of the sensor-stored metadata. A local data store is responsible for maintaining the sensor-stored metadata, which may be uploaded from a plurality of agents and/or downloaded from other sources (including the cybersecurity intelligence hub) in accordance with a prescribed storage (caching) policy.

Upon determining that the monitored event is "distinct," the cybersecurity sensor stores at least the collected metadata within the local data store and provides a submission, including at least the collected metadata, for analysis by the DMAE within the cybersecurity intelligence hub. In particular, the DMAE determines whether the distinctive metadata of the collected metadata is present in the global data store, and if so, a verdict (classification) of a prior evaluated event, which corresponds to the monitored event associated with the distinctive metadata, is returned to the cybersecurity sensor for storage (or cross-reference) with at least the collected metadata. Where the verdict is a "malicious" classification, the cybersecurity sensor may issue (or initiate issuance of) an alert. Where the verdict is a "benign" classification, the cybersecurity sensor may simply halt further operations associated with this submission (as the entry of the sensor's data including at least the collected metadata has been newly added).

Upon determining that the monitored event is "indistinct," namely the distinctive metadata matches a portion of the sensor-stored metadata within an entry of the sensor's data store, the sensor performs operations based on the discovered verdict as described above. Herein, it is contemplated that a count associated with an entry including the portion of the sensor-stored metadata is incremented regardless of the verdict.

However, where the DMAE determines that the collected metadata is distinct, namely the distinctive metadata is not stored in the global data store (as part of the hub-stored metadata), for execution events, the DMAE may provide some of the distinctive metadata (e.g., an identifier of the object associated with the monitored event such as a hash value or checksum) to object analysis services. If the object has not been analyzed by the object analysis services, according to one embodiment of the disclosure, a request for a copy of the object (e.g., a file constituting an event) may be returned to the DMAE. The DMAE fetches the object from the endpoint via the cybersecurity sensor. Thereafter, the object analysis services conduct malware detection operations on the object in an effort to confirm a verdict (malicious, benign) for that object. In other embodiments, the sensor may make a determination of whether to initiate or conduct malware detection operations on the object with the determination and types of operations, and further in some implementations, configurable by an administrator.

For other types of events, such as network or operation events for example, where the DMAE determines that the distinctive metadata associated with this event is "distinct," the DMAE may utilize various enrichment services (described below) in an attempt to classify the object. For a network event, for example, the DMAE may send a portion of the collected metadata (e.g., SRC_IP, DEST_IP, and/or DEST_PORT) to the enrichment services or allow such services to gain access to the portion of the collected metadata in efforts to classify the event (e.g., identify whether targeted website is benign or malicious, etc.). If no verdict can be determined through such analysis, the collected metadata within the global data store may be classified of "unknown," and this "unknown" verdict is returned to the local data store within the cybersecurity sensor (and optionally the local data store within the endpoint). The "unknown" verdict may be used to triggered additional malware analyses as described below.

II. Terminology

In the following description, certain terminology is used to describe features of the invention. In certain situations, each of the terms "logic," "system," "component," or "engine" is representative of hardware, firmware, and/or software that is configured to perform one or more functions. As hardware, the logic (or system/component/engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or system/component/engine) may be software in the form of one or more software modules. The software modules may include an executable application, a daemon application, an application programming interface (API), a subroutine, a function, a procedure, an applet, a servlet, a routine, source code, a dynamic link library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

A "network device" may be construed as either a physical electronic device featuring data processing and/or network connection functionality or a virtual electronic device being software that virtualizes at least a portion of the functionality of the physical electronic device. One type of network device is an endpoint that operates as (or operates within) a laptop, a set-top box or other consumer electronic device. Other examples of a network device may include, but are not limited or restricted to a server, mobile phone (which may be operating as a mobile hot spot), a desktop computer, a standalone malware detection appliance, a network adapter, or an intermediary communication device (e.g., router, firewall, etc.), a virtual machine, or any other virtualized resource.

The term "object" generally relates to content having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a file; any document such as a Portable Document Format "PDF" document; a word processing document such as Word® document; an electronic mail "email" message, web page, or other non-executable file, etc.), or simply a collection of related data. In some situations, the object may be retrieved from information in transit (e.g., a plurality of packets) or information at rest (e.g., data bytes from a storage medium).

The term "metadata" generally refers to a collection of information. The collection of information may be associated with an event or an object for example. The content of the metadata may depend, at least in part, on the type of event (or object) to which the metadata pertains. As an illustrative example, an event related to a particular activity performed by a process may include a path identifying a location of an object being referenced by the process and an identifier of the object (e.g., hash value or checksum of the object). Likewise, an event related to an attempted or successful network connection may include at least a destination address (SRC_IP); and a destination port associated with the network connection (DEST_PORT).

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format. The message may be delivered in accordance with a "push" or "pull" delivery scheme.

As described above, each cybersecurity sensor may be deployed as a "physical" or "virtual" network device, as described above. Examples of a "cybersecurity sensor" may include, but are not limited or restricted to the following: (i) a cybersecurity appliance that monitors incoming and/or outgoing network traffic, emails, etc.; (ii) a firewall; (iii) a data transfer device (e.g., router, repeater, portable mobile hotspot, etc.); (iv) a security information and event management system ("SIEM"); (v) a virtual device being software that supports data capture, preliminary analysis of data for malware, and metadata extraction, including an antivirus application or malware detection agent; (vi) exchange or web server equipped with malware detection software; or the like.

The term "computerized" generally represents that any corresponding operations are conducted by hardware in combination with software and/or firmware.

As briefly described above, the term "malware" may be broadly construed as any code, communication or activity that initiates or furthers an attack (hereinafter, "cyber-attack"). Malware may prompt or cause unauthorized, unexpected, anomalous, unintended and/or unwanted behaviors or operations constituting a security compromise of information infrastructure (generally "attack-oriented behaviors"). For instance, malware may correspond to a type of malicious computer code that, upon execution and as an illustrative example, takes advantage of (exploit) a vulnerability in a network, for example, to gain unauthorized access, harm or co-opt operation of a network device or misappropriate, modify or delete data. Alternatively, as another illustrative example, malware may correspond to information (e.g., executable code, script(s), data, command (s), etc.) that is designed to cause a network device to experience attack-oriented behaviors. Examples of these attack-oriented behaviors may include a communication-based anomaly or an execution-based anomaly, which, for example, could (1) alter the functionality of a network device in an atypical and unauthorized manner; and/or (2) provide unwanted functionality which may be generally acceptable in another context.

In certain instances, the terms "compare," "comparing," "comparison," or other tenses thereof generally mean determining whether two items match, where a "match" constitutes a finding that the compared items are identical or exceed a prescribed threshold of correlation. The compared items may include metadata.

The term "interconnect" may be construed as a physical or logical communication link (or path) between two or more network devices. For instance, as a physical link, wired and/or wireless interconnects feature the form of electrical wiring, optical fiber, cable, bus trace, or a wireless channel using infrared, radio frequency (RF), may be used. A logical link includes well-defined interfaces, function calls, shared resources, dynamic linking, or the like.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Comprehensive Cybersecurity Platform—General Architecture

Referring to FIG. 1, a block diagram of an exemplary embodiment of a comprehensive cybersecurity platform (CCP) 100 is shown. For this embodiment, the CCP 100 features endpoints $130_1$-$130_M$ (M≥2) (first stage); cybersecurity sensors $120_1$-$120_N$ (N≥1) (second stage) each capable of supporting a plurality of agents (e.g., tens or hundreds); and a cybersecurity intelligence hub 110 (third stage) supporting a number of cybersecurity sensors $120_1$-$120_N$ (e.g., tens or hundreds). This multi-stage cybersecurity platform controls the propagation of cybersecurity intelligence from the endpoints $130_1$-$130_M$ to the cybersecurity intelligence hub 110 by significantly mitigating the transfer of repetitive cybersecurity intelligence between stages. Without such controls, the CCP 100 could not effectively aggregate and provide access to cybersecurity intelligence from thousands of sources.

Herein, for illustrative purposes, a three-stage cybersecurity platform scheme is described with each stage including deduplication logic that selectively determines what cybersecurity intelligence to further process or provide to the next stage, where the cybersecurity intelligence is ultimately targeted for storage within a global data store 180 of the cybersecurity intelligence hub 110. However, it is contemplated that the CCP 100 may be organized in accordance with any of a variety of "nested" deduplication logic layouts, such as deduplication logic being deployed at selected neighboring stages (e.g., the sensors $120_1$-$120_N$ and hub 110 without deployment at the agents $130_1$-$130_M$; the agents $130_1$-$130_M$ and sensors $120_1$-$120_N$ without deployment at the hub 110) or at non-neighboring stages (e.g., the agents $130_1$-$130_M$ and the hub 110 without deployment at the sensors $120_1$-$120_N$).

According to one embodiment of the disclosure, as shown in FIG. 1, the CCP 100 comprises a cybersecurity intelligence hub 110 communicatively coupled to one or more cybersecurity sensors $120_1$-$120_N$ (N≥1) via a network, and the cybersecurity sensors $120_1$-$120_N$ are communicatively coupled to one or more endpoints $130_1$-$130_M$ (M≥1). Each cybersecurity sensors $120_1$, . . . , or $120_N$ may be deployed on-premises with its supported endpoints $130_1$-$130_M$, remotely thereof, or a combination of both types of deployments. As shown, each cybersecurity sensor is capable of supporting multiple endpoints such as cybersecurity sensor $120_1$ supporting endpoints $130_1$-$130_3$ and cybersecurity sensor $120_N$ supporting endpoints $130_{M-1}$-$130_M$. As shown, each of these endpoint $130_1$-$130_3$ and $130_{M-1}$-$130_M$ includes a cybersecurity agent $135_1$-$135_3$ and $135_{M-1}$-$135_M$, respectively.

As described herein, each cybersecurity agent $135_1$-$135_M$ is software, running in the foreground or in the background as a daemon, which is configured to monitor for particular events or particular types of events (e.g., certain tasks or activities) that occur during operation of its corresponding endpoint (e.g., endpoint $130_1$). Each agent $135_1$, . . . , or $135_M$ may be configured as a static software component, where the monitored events are predetermined and cannot be modified or expanded. However, as an alternative embodiment, each agent $135_1$, . . . , or $135_M$ may be configured as a dynamic software component allowing for modification as to which events are monitored without re-installation of the agent $135_1$. Illustrative examples of types of monitored events may include, but are not limited or restricted to (i) writing an object (e.g., file) to disk, (ii) opening an object (e.g., file), (iii) starting execution of an object (e.g., executable), (iv) connecting to a network, (v) attempting a logon operation, (vi) changing a registry key, or the like.

As shown in FIG. 1, according to one embodiment of the disclosure, the agents $135_1$-$135_M$ operating within respective endpoints $130_1$-$130_M$ are communicatively coupled to the cybersecurity sensors $120_1$-$120_N$ over one or more interconnects $140_1$-$140_M$. Upon detecting a monitored event, an agent (e.g., agent $135_1$) collects (and places in temporary storage) metadata 150 associated with the monitored event. According to one embodiment of the disclosure, the agent $135_1$ also conducts a first deduplication analysis on the collected metadata 150 to determine whether the monitored event has been previously observed. This determination may involve performing a comparison between a portion of the collected metadata 150 that distinctively identifies the monitored event (e.g., distinctive metadata 151), and corresponding portions of stored metadata 165 within entries (e.g., entry 162) of the local data store 160 (hereinafter, "endpoint-stored metadata" 165). It is noted that each of the entries (and entries of other data stores) may contain distinctive metadata associated with a prior evaluated event, where the distinctive metadata may be normalized to exclude certain parameters that are not required for cybersecurity analysis (e.g., password for credential events, PII, etc.). The distinctive metadata may include the collected Stated differently, depending on the event type, the agent $135_1$ may rely on different distinctive metadata to identify the monitored event, and as a result, the agent $135_1$ may access a different portion of the endpoint-stored metadata 165 for comparison, as described in detail below.

According to one embodiment of the disclosure, the prescribed storage (caching) policy utilized by the endpoint's local data store 160 may impact the categorization of a monitored event as "distinct." More specifically, the storage policy utilized by the endpoint's local data store 160 may control metadata validation and retention within the local data store 160 such as through LRU (Least Recently Used), FIFO (first-in, first-out), or a time-based validation scheme where the agent-based metadata 165 can reside within the local data store 160 for a prescribed period of time until the agent-based metadata 165 is considered "stale" (e.g., invalid). Hence, in certain situations, a monitored event still may be categorized as "distinct" by the agent $135_1$, despite the presence of matching agent-based metadata 165 in the local data store 160.

Moreover, repetitive access matches to a portion of the endpoint-stored metadata 165 within a particular entry 162 also may impact the categorization of a monitored event as "distinct." For example, the number of repetitive occurrences of a prior evaluated event (represented by the endpoint-stored metadata within the particular entry 162) may be monitored, where the count 163 is increased with every detected occurrence. Hence, when the count 163 exceeds a threshold value over a prescribed time window, the entry 162 may be "tagged" to cause the agent $135_1$ to classify any monitored event represented by distinctive metadata that matches the endpoint-stored metadata within the particular entry 162.

In response to the agent $135_1$ determining that the monitored event has been categorized as "distinct," the agent $135_1$ provides at least the collected metadata 150 to the cybersecurity sensor $120_1$ over the interconnect $140_1$. According to one embodiment of the disclosure, besides providing the collected metadata 150, the agent $135_1$ may provide additional metadata 152 associated with the monitored event. For instance, the additional metadata 152 may include characteristics of the operating environment from which the collected metadata 150 is provided. For example, these characteristics may be directed to an identifier of the endpoint $130_1$ featuring the agent $135_1$ (e.g., model number, software product code, etc.), an IP address of the endpoint $130_1$, geographic identifier surmised from the endpoint's IP address, a software profile or software version utilized by the agent $135_1$, time of analysis, or the like. Additionally, or in the alternative, the agent $135_1$ could collect/send additional metadata for other events such as additional events related (e.g., linked) to the monitored events.

Hence, for clarity sake, the metadata provided to the cybersecurity sensor $120_1$, which includes the collected metadata 150 and optionally includes the additional metadata 152, shall be referred to as "agent-evaluated metadata 155."

Herein, the agent-evaluated metadata 155 may be provided to the cybersecurity sensor $120_1$ in order to (i) obtain a verdict (e.g., classification, benign or malicious) from the cybersecurity sensor $120_1$ (if the monitored event is known) or (ii) maintain currency and relevancy of a data store 170 of the cybersecurity sensor $120_1$ and/or the global data store 180 of the cybersecurity intelligence hub 110 to provide more immediate malware detection results to customers. Herein, the agent-evaluated metadata 155 may be provided in accordance with a "push" or "pull" delivery scheme as described below. In general, the "push" delivery scheme involves the generation and transmission by the agent $135_1$ of a message, including the agent-evaluated metadata 155, to the cybersecurity sensor $120_1$. Alternatively, the "pull" delivery scheme involves the cybersecurity sensor $120_1$ periodically or aperiodically requesting delivery of newly collected metadata from the agent $135_1$, and the agent $135_1$, in response, provides the agent-evaluated metadata 155 to the cybersecurity sensor $120_1$. The agent-evaluated metadata 155 is also now stored as one of the entries within the local data store 165.

After receipt of at least the agent-evaluated metadata 155, the cybersecurity sensor $120_1$ conducts a second deduplication analysis. This second deduplication analysis includes a comparison of a portion of the agent-evaluated metadata 155 that distinctively identifies the monitored event to corresponding portions of the sensor-stored metadata 175 (i.e., stored metadata within entries of the data store 170). According to one embodiment of the disclosure, the portion of the agent-evaluated metadata 155 used in the second deduplication analysis at the cybersecurity sensor $120_1$ may be the distinctive metadata 151 of the collected metadata 150 used in the first deduplication analysis at the endpoint $130_1$. According to another embodiment of the disclosure, however, the portion of the agent-evaluated metadata 155 used in the second deduplication analysis at the cybersecurity sensor $120_1$ may differ from the distinctive metadata 151 used in the first deduplication analysis at the endpoint $130_1$. For clarity sake, the distinctive metadata at all stages will be referenced as "distinctive metadata 151."

The cybersecurity sensor $120_1$ determines whether the monitored event had been previously observed. This may be accomplished by determining whether a portion of the agent-evaluated metadata 155 (e.g., the distinctive metadata 151) matches a portion of the sensor-stored metadata 174 residing within a particular entry 172 of the data store 170. The portion of the sensor-stored metadata 174 corresponds to metadata representing a prior evaluated event determined to be the monitored event. Upon determining that the monitored event has been previously observed, the cybersecurity sensor $120_1$ may increment the count 173, which records the repetitive detections by different agents of the prior evaluated event represented by the sensor-based metadata within the entry 172.

Furthermore, where the verdict attributed to the prior evaluated event and contained in the sensor-stored metadata 174 is of a "malicious" classification, the cybersecurity sensor $120_1$ may generate an alert 176, perform another remediation technique, and/or conduct additional analytics on the agent-evaluated metadata 155. The additional analysis may be performed by the cybersecurity sensor $120_1$, by the agent $135_1$, or by other logic within the endpoint $130_1$ deploying the agent $135_1$. For example, an object or a portion of the evaluated metadata 155 may be run through a machine learning algorithm on the endpoint $130_1$, where prevention/remediation action may be undertaken based on the verdict.

Repetitive access matches to sensor-stored metadata 175 may be captured by increasing the count 173 associated with entry 172, for use in entry replacement and/or re-confirming verdict for the prior evaluated event associated with the entry 172.

If no match is detected, the cybersecurity sensor $120_1$ determines that the monitored event remains categorized as "distinct" across all endpoints supported by the sensor $120_1$ (e.g., a new (currently unrecorded) observation of a particular event across all supported endpoints by the cybersecurity sensor $120_1$). The cybersecurity sensor $120_1$ provides at least the agent-evaluated metadata 155 to the cybersecurity intelligence hub 110. Besides providing the agent-evaluated metadata 155, according to one embodiment of the disclosure, the cybersecurity sensor $120_1$ also may provide additional metadata 177 associated with the monitored event such as characteristics of the cybersecurity sensor $120_1$ and/or its operating environment for example. The additional metadata 177 may include an identifier of the cybersecurity sensor $120_1$ (e.g., a device identification "ID" such as a PCI ID, software product code, or any other number, character, or alphanumeric value that uniquely identifies a particular type of physical or virtual component), an IP address of the cybersecurity sensor $120_1$, software profile or software version utilized by the cybersecurity sensor $120_1$, time of analysis, preliminary verdict (if malware analysis performed concurrently), or the like.

Also, according to another embodiment of the disclosure, the additional metadata 177 may include other metadata collected by the cybersecurity sensor $120_1$ that pertain to events related to the monitored event and/or events in temporal proximity to the monitored event, as partially described in U.S. patent application Ser. No. 15/725,185 entitled "System and Method for Cyberattack Detection Utilizing Monitored Events," filed Oct. 4, 2017 and incorporated by reference herein, Hence, the metadata provided to the cybersecurity intelligence hub 110, which include the agent-evaluated metadata 155 and optionally the additional metadata 177, shall be referred to as "sensor-evaluated metadata 179." The sensor-evaluated metadata 179 is also stored within one or more of the entries of the data store 175 or portions of the sensor-evaluated metadata 179 stored separately and cross-referenced to each other.

Referring still to FIG. 1, the cybersecurity intelligence hub 110 receives, parses, analyzes and stores, in a structured format within the global data store 180, cybersecurity intelligence received from the cybersecurity sensors $120_1$-$120_N$. As shown, the cybersecurity intelligence hub 110 is configured to receive cybersecurity intelligence (e.g., the sensor-evaluated metadata 179) from the first cybersecurity sensor $120_1$. The cybersecurity intelligence hub 110 includes a data management and analytics engine (DMAE) 115, which is configured to verify a verdict (e.g., a "benign," "malicious," or "unknown" classification) for the monitored event based on analyses of a portion of the sensor-evaluated metadata 179 that distinctively identifies the monitored event for comparison with one or more portions of the hub-stored metadata 185 (i.e., metadata associated with prior evaluated events) stored within the global data store 180.

Where the portion of the sensor-evaluated metadata 179 (representing the monitored event) matches at least one portion of the hub-based metadata 185 (representing a prior evaluated event) maintained in the global data store 180, the cybersecurity intelligence hub 110 may determine a source of the sensor-evaluated metadata 179 from its content (or the IP source address of the cybersecurity sensor $120_1$ accompanying the sensor-evaluated metadata 179). Thereafter, the cybersecurity intelligence hub 110 provides a verdict and other hub-based metadata associated with the prior evaluated event(s) corresponding to the monitored event, to the cybersecurity sensor $120_1$ to handle reporting, remediation and/or additional analytics. As described above, it is contemplated that the reporting by the cybersecurity sensor $120_1$ may include a bundle of cybersecurity intelligence associated with a set of events (including the monitored event), which may include metadata collected by the cybersecurity sensor $120_1$ that pertains to monitored event as well as other events that are related to (and different from) the monitored event and/or events in temporal proximity to the monitored event. This enhanced reporting allows the cybersecurity sensor $120_1$ to provide greater context surrounding the monitored event for cybersecurity detection and prevention.

However, upon determining that the monitored event remains categorized as "distinct" across all (supported by the hub) cybersecurity sensors $120_1$-$120_M$ and corresponding endpoints $130_1$-$130_M$ (e.g., no portion of the hub-based metadata 185 matches the portion of the sensor-evaluated metadata 179), the cybersecurity intelligence hub 110 is configured to evaluate what enrichment services 190 are available to obtain a verdict for the monitored event. As shown in FIG. 1, the cybersecurity intelligence hub 110 is communicatively coupled to the enrichment services 190, which include backend web services 192, third party web services 194, and/or an object analysis services 199, which may be a separate service or part of the backend web services 192.

The enrichment services 190 provide the cybersecurity intelligence hub 110 with access to additional cybersecurity analytics and cybersecurity intelligence using a push and/or pull communication scheme. In accordance with the selected scheme, cybersecurity intelligence may be provided (i) automatically, in a periodic or aperiodic manner, to the DMAE 115 of the cybersecurity intelligence hub 110 or (ii) responsive to a query initiated by the cybersecurity intelligence hub 110 requesting analytics or intelligence of the portion of sensor-based metadata 179. Although not shown, one embodiment of the cybersecurity intelligence hub 110 features one or more hardware processors, a non-transitory storage medium including the DMAE 115 to be executed by the processor(s), and the global data store 180.

As an illustrative example, the backend web services 192 may feature one or more servers that deliver cybersecurity intelligence. The cybersecurity intelligence may include, but is not limited or restricted to (i) incident investigation/response intelligence 193, (ii) forensic analysis intelligence 194 using machine-learning models, and/or (iii) analyst-based intelligence 195. More specifically, the incident investigation/response intelligence 193 may include cybersecurity intelligence gathered by cyber-attack incident investigators during analyses of successful attacks. This cybersecurity intelligence provides additional metadata that may identify the nature and source of a cyber-attack, how the identified malware gained entry on the network and/or into a particular network device connected to the network, history of the lateral spread of the malware during the cyber-attack, any remediation attempts conducted and the result of any attempts, and/or procedures to detect malware and prevent future attacks.

Likewise, the forensic analysis intelligence 194 may include cybersecurity intelligence gathered by forensic analysts or machine-learning driven forensic engines, which are used to formulate models for use in classifying an event, upon which a verdict (classification) of submitted metadata may be returned to the cybersecurity intelligence hub 110 for storage (or cross-reference) with the submitted metadata. The analyst-based intelligence 195 includes cybersecurity intelligence gathered by highly-trained cybersecurity analysts, who analyze malware to produce metadata directed to its structure and code characteristics that may be provided to the cybersecurity intelligence hub 110 for storage as part of the hub-stored metadata 185 within the global data store 180.

Similarly, the third party web services 196 may include cybersecurity intelligence 197 gathered from reporting agencies and other cybersecurity providers, which may be company, industry or government centric. The cybersecurity intelligence 197 may include black lists, white lists, and/or URL categorization. Also, attacker intelligence 198 may be available, namely cybersecurity intelligence gathered on known parties that initiate cyber-attacks. Such cybersecurity intelligence may be directed to who are the attackers (e.g., name, location, etc.), whether state-sponsored attackers as well as common tools, technique and procedures used by a particular attacker that provide a better understanding typical intent of the cyber-attacker (e.g., system disruption, information exfiltration, etc.), and the general severity of cyber-attacks initiated by a particular attacker.

Collectively, metadata received from the endpoints $130_1$-$130_M$ as well as cybersecurity intelligence from the enrichment services 190 may be stored and organized as part of the hub-stored metadata 185 within the global data store 180 searchable by an administrator via a user interface of a computer system (not shown) on an object basis, device basis, customer basis, time-basis, industry-basis, geographic-based, or the like.

The object analysis services 199 conducts malware detection operations on an object retrieved by the cybersecurity intelligence hub 110, which may be accessed when the hub-store metadata 185 of the global data set 180 fails to match the portion of the sensor-evaluated metadata 179 that distinctly represents the monitored event. Alternatively, the object analysis services 199 may be accessed where a portion of the hub-store metadata 185 matches the portion of the sensor-evaluated metadata 179, but the verdict within the matching portion of the hub-store metadata 185 is of an "unknown" classification. These malware detection operations may include, but are not limited or restricted to one or more static analyses (e.g., anti-virus, anti-spam scanning, pattern matching, heuristics, and exploit or vulnerability signature matching), one or more run-time behavioral analyses, and/or one or more event-based inspections using machine-learning models. Additionally, the DMAE 115 may also provide the object (or make the object available) to additional backend web services 192 and/or third party web services 196 that assist in the analysis of characteristics of the object (e.g., source, object name, etc.) to classify the object (and one or more events associated with the object).

With respect to the architecture of the cybersecurity intelligence hub 110, some or all of the cybersecurity intelligence hub 110 may be located at an enterprise's premises (e.g., located as any part of the enterprise's network infrastructure whether located at a single facility utilized by the enterprise or at a plurality of facilities and co-located with any or all of the sensors $120_1$-$120_N$ and/or endpoints $130_1$-$130_M$). As an alternative embodiment, some or all of the cybersecurity intelligence hub 110 may be located outside the enterprise's network infrastructure, generally referred to as public or private cloud-based services that may be hosted by a cybersecurity provider or another entity separate from the enterprise (service customer). For example, one of these embodiments may be a "hybrid" deployment, where the cybersecurity intelligence hub 110 may include some logic partially located on premises and other logic located as part of a cloud-based service. This separation allows for sensitive cybersecurity intelligence (e.g., proprietary intelligence learned from subscribing customers, etc.) to remain on premises for compliance with any privacy and regulatory requirements.

IV. Endpoint and Communications

A. General Architecture—Endpoint

Figure 2:
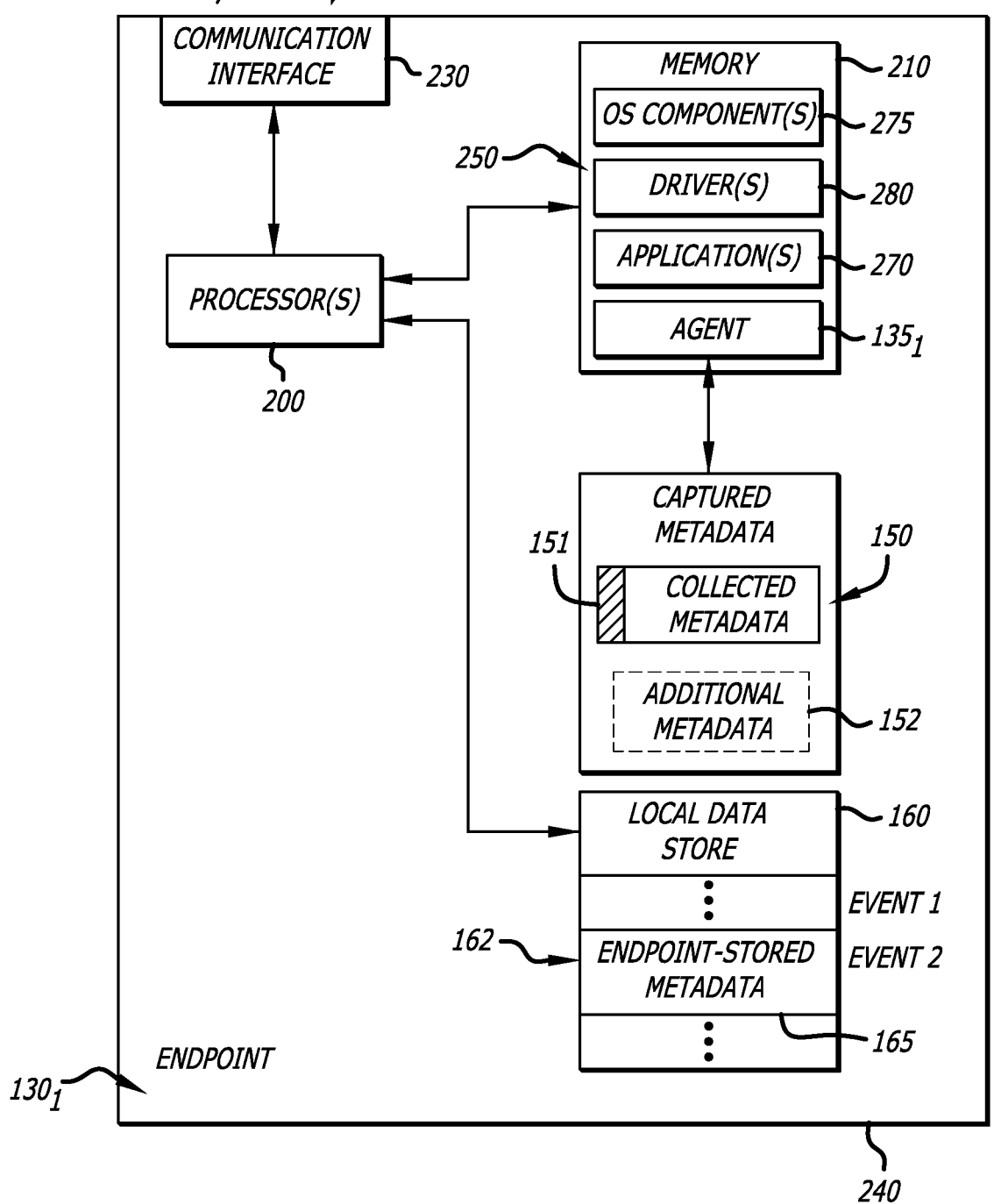
FIG. 2 is an exemplary embodiment of an agent deployed within an endpoint of FIG. 1.

Referring now to FIG. 2, an exemplary embodiment of the endpoint $130_1$ deployed within the comprehensive cybersecurity platform (CCP) 100 of FIG. 1 is shown. According to this embodiment of the disclosure, the endpoint $130_1$ comprises a plurality of components, including one or more hardware processors 200 (referred to as "processor(s)"), a non-transitory storage medium 210, the local data store 160, and at least one communication interface 230. As illustrated, the endpoint $130_1$ is a physical network device, and as such, these components are at least partially encased in a housing 240, which may be made entirely or partially of a rigid material (e.g., hard plastic, metal, glass, composites, or any combination thereof) that protects these components from environmental conditions.

The hardware processor(s) 200 is a multi-purpose, processing component that is configured to execute logic 250 maintained within the non-transitory storage medium 210 operating as a memory. One example of processor 200 includes an Intel® central processing unit (CPU) based on an x86 architecture and instruction set. Alternatively, processor(s) 200 may include another type of CPU, a digital signal processor, an Application Specific Integrated Circuit (ASIC), a field-programmable gate array, or any other hardware component with data processing capability.

The local data store 160 may include non-volatile memory to maintain metadata associated with prior evaluated events in accordance with a prescribed storage policy (e.g., cache validation policy). The prescribed storage policy features a plurality of rules that are used to determine entry replacement and/or validation, which may impact the categorization of a detected, monitored event as "distinct" or not.

The communication interface 230 may be configured as an interface to receive the object 260 via any communication medium. For instance, the communication interface 230 may be network adapter to receive the object 260 via a network, an input/output (TO) connector to receive the object 260 from a dedicated storage device, or a wireless adapter to receive the object via a wireless communication medium (e.g., IEEE 802.11 type standard, Bluetooth™ standard, etc.). The agent $135_1$ may be configured to monitor, perhaps on a continuous basis when deployed as daemon software, for particular events or particular types of events occurring during operation of the endpoint $130_1$. Upon detecting a monitored event, the agent $135_1$ is configured to determine whether the monitored event is "distinct," as described herein.

In some situations, monitored events may be detected during execution of the object 260 or processing of the object 260 using a stored application 270, while in other situations, the monitored events may be detected during endpoint operations (e.g., logon, attempted network connection, etc.). From these events, the agent $135_1$ may rely on the stored application 270, one or more operating system (OS) components 275, and/or one or more software driver(s) 280 to assist in collecting metadata associated with the detected, monitored event. When the agent $135_1$ determines the monitored event is "distinct," the collected metadata may be included as part of a submission 290 provided to the cybersecurity sensor $120_1$ of FIG. 1.

Figure 3:
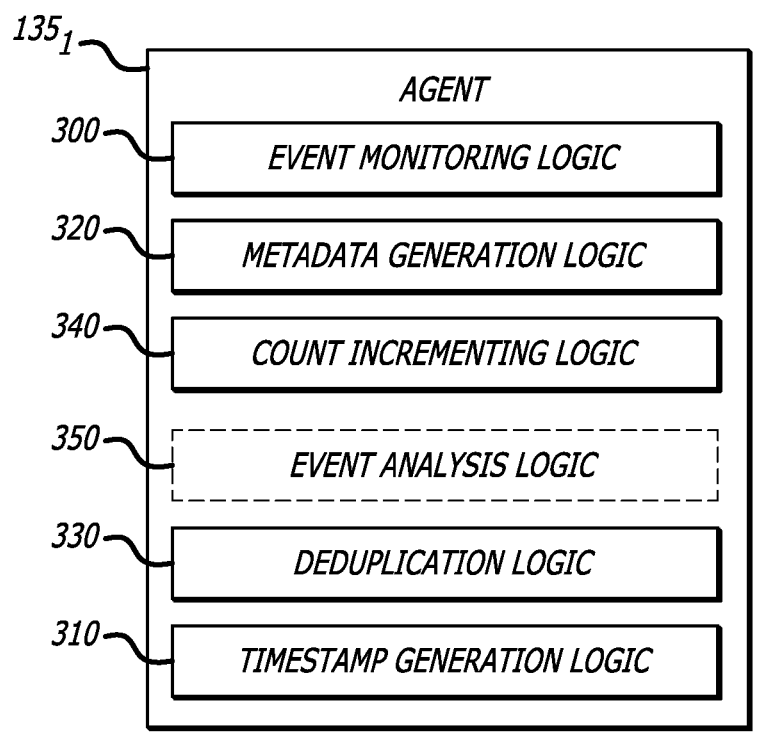
FIG. 3 is an exemplary embodiment of the logical architecture of the agent of FIG. 2.

Referring now to FIG. 3, an exemplary embodiment of the logical architecture of the agent $135_1$ of FIG. 2 is shown. The agent $135_1$ includes event monitoring logic 300, a timestamp generation logic 310, metadata generation logic 320, deduplication logic 330 and count incrementing logic 340. The above-identified logic 300-340 operate in combination to detect an event and determine whether the event is categorized as "distinct" to cause metadata associated with the monitored event to be directed to the cybersecurity sensor $120_1$ and/or the central intelligence hub 110 for further evaluation. As optional logic, the agent $135_1$ may include event analysis logic 350 to perform a preliminary analysis of the event in an attempt to determine whether the event is malicious, benign or suspicious (i.e., unable to definitively confirm the benign or malicious classification of the event). The preliminary analysis may include, but are not limited or restricted to one or more static analyses (e.g., anti-virus, anti-spam scanning, pattern matching, heuristics, and/or signature matching).

B. Endpoint Communications

Figure 4A:
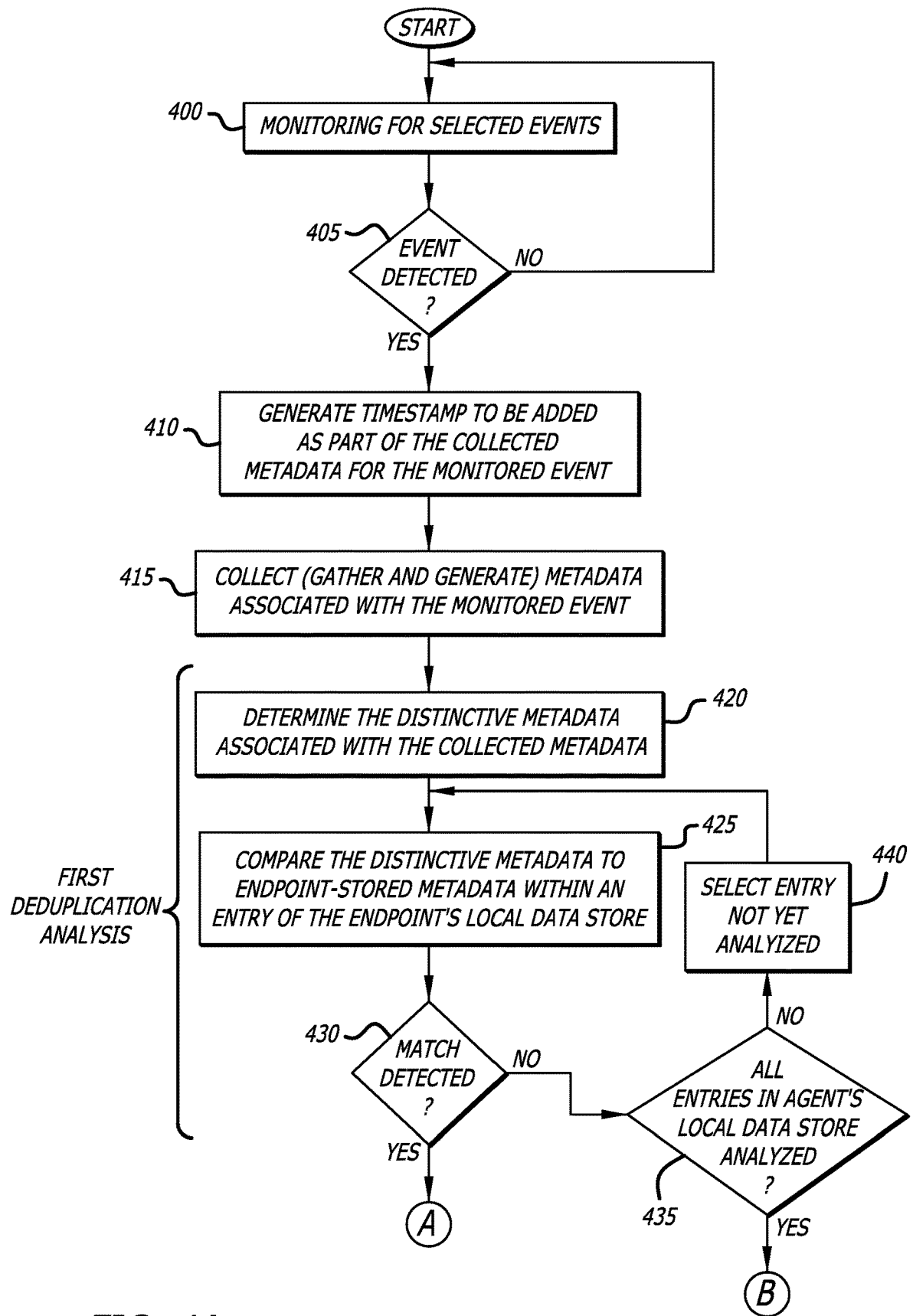
FIGS. 4A-4B are exemplary flowcharts of the operations performed by agent, including the deduplication operations for illustrative event types.

Referring now to FIG. 4A, an exemplary flowchart of the operations performed by the agent $135_1$ referencing the logic of the agent $135_1$ illustrated in FIG. 3 is shown. Herein, the event monitoring logic 300 is configured to monitor for selected events where the monitored events may be set as those events that have a higher tendency of being associated with a cyber-attack (see block 400 of FIG. 4A). As described above, examples of these monitored events may be categorized as (i) an execution event being a task or activity performed by a process, which may manipulate an object (e.g., opening, or writing closing to a file) or creating new processes; (ii) network event being an activity involving establishing or maintaining network connectivity to a network device (e.g., an attempted network connection, etc.); or an "operation event" directed to endpoint operability such as a Domain Name System (DNS) lookup or a logon or logoff operation.

After detecting a monitored event by the event monitoring logic 300, the timestamp generation logic 310 generates a timestamp, included as part of the collected metadata 150, to identify a detection time for the monitored event (see blocks 405-410 of FIG. 4A). The timestamp may be utilized as a search index (notably when the event is determined to be distinct and the metadata associated with the event is stored within the local data store 320 of the cybersecurity sensor 120 or the global data store 180 of the cybersecurity intelligence hub 110). Additionally, or in the alternative, the timestamp may be utilized to maintain currency of the metadata associated with the events stored within the local data store 320 and the global data store 180 to allow for replacement and/or validation of "stale" metadata.

Referring still to FIGS. 2-3 and FIG. 4A, the metadata generation logic 320 collects, by gathering and generating, the metadata 150 being associated with the monitored event (see block 415 of FIG. 4A). The monitored event type, detected by the monitoring detection logic 300, may be used in determining, at least in part, the metadata to be collected, especially the distinctive metadata 151 (see block 420 of FIG. 4A). For instance, as an illustrative embodiment, where the monitored event is an execution event such as an open file command for example, the metadata generation logic 320 controls collection of metadata associated with this execution event and forms a data structure for the collected metadata 150. As an illustrative example, the data structure may include (i) a pointer to a file path providing access to the file, (ii) a file identifier (e.g., a hash value or checksum generated upon retrieval of the file via the file path), (iii) a name of the file, (iv) a creation date or other properties of the file, and/or (v) the name of the process initiating the open file command. With respect to the collected metadata 150 associated with the execution event, the distinctive metadata 151 may be represented by a portion of a data structure forming the collected metadata 150, namely (i) a first field including the file path and (ii) a second field including the file identifier.

Similarly, as another illustrative example, where the monitored event is an network event such as an attempted network connection for example, the metadata generation logic 320 controls collection of metadata directed to port and addressing information, including at least (i) a source address such as a source Internet Protocol (IP) address ("SRC_IP"); (ii) a destination address such as a destination IP address ("DEST_IP"); (iii) a destination port ("DEST_PORT"); (iv) a source port for the network connection ("SRC_PORT"); and/or (v) attempted connect time. Hence, from this collected metadata 150 associated with this network event, the distinctive metadata 151 may be represented by a data structure including at least (i) a first field including the SRC_IP, (ii) a second field including the DEST_IP, and (iii) a third field including the DEST_PORT for the attempted network connection.

Lastly, as another illustrative example, where the monitored event is an operation event, such as a logon for example, the agent collects metadata associated with this logon event, including at least (i) the username; (ii) logon type (e.g., remote, on premise); (iii) time of logon; and (iv) user account information. Hence, the collected metadata 150 associated with the operation event may be represented by a data structure including at least the distinctive metadata 151 identified above.

After the collected metadata 150 has been gathered and generated by the metadata generation logic 320, the deduplication logic 330 conducts an analysis of the monitored event to determine whether or not the monitored event is "distinct." (see blocks 420-440 of FIG. 4A). According to one embodiment of the disclosure, the deduplication logic 330 analyzes the endpoint-stored metadata 165 for a presence of the distinctive metadata 151 while taking into account the prescribed storage (caching) policy of the local data store 160.

More specifically, the deduplication logic 330 determines the distinctive metadata 151 associated with the collected metadata 150 based on the monitored event type (see block 420 of FIG. 4A). Thereafter, the deduplication logic 330 determines whether the distinctive metadata (representing the monitored event) is stored within one or more portions of the endpoint-stored metadata 165, where such storage is in compliance with prescribed storage policy of the local data store 160 (see blocks 425-440 of FIG. 4A). This determination may involve comparing the distinctive metadata 151 to one or more portions of the endpoint-stored metadata 165 within an entry of the endpoint's local data store 160 (see block 425 of FIG. 4A). For this comparison, when a match is not detected, the deduplication logic 330 continues such comparisons until all entries of the endpoint's local data store have been analyzed (see blocks 430-440 of FIG. 4A). Although not illustrated, it is contemplated that the deduplication logic 330 may further confirm that storage of the portion of the endpoint-stored metadata 165 is in compliance with storage policy and evaluate the count for an entry including a portion of endpoint-stored metadata that matches the distinctive metadata. When the count exceeds a prescribed threshold within a prescribed time window, the deduplication logic 330 may circumvent its finding and identify the collected metadata 150 as "distinct" in order to transmit the collected metadata to the cybersecurity sensor $120_1$ for further analysis, as repeated activity may signify a cyber-attack.

Figure 4B:
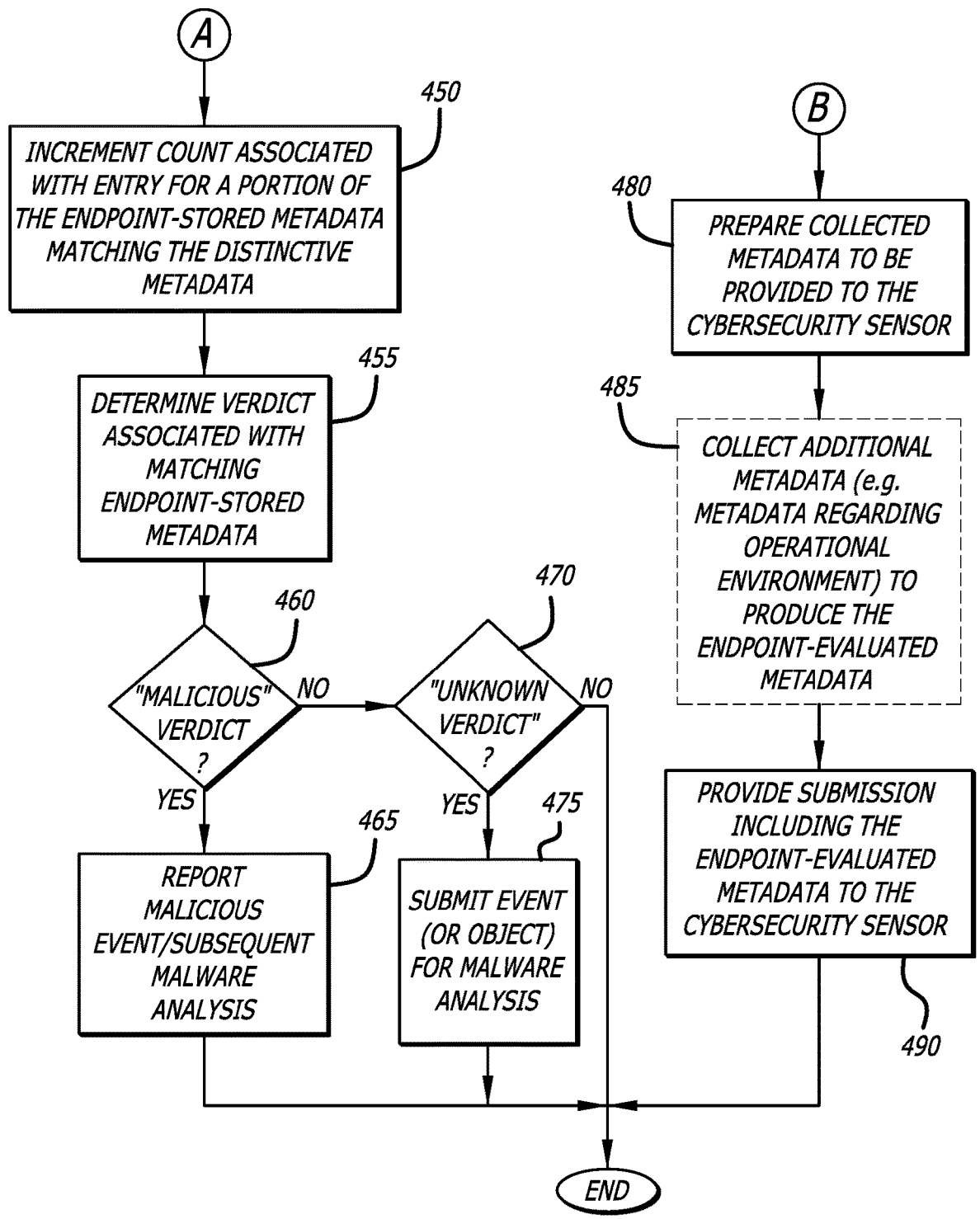

Referring now to FIG. 3 and FIG. 4B, in response to detecting a match between the distinctive metadata 151 and a portion of the endpoint-stored metadata 165 within an entry of the local data store, the count incrementing logic 340 of the agent increments a count associated with the entry (see block 450 of FIG. 4B). Although not illustrated, the count is used to monitor repetitious events and allows the deduplication logic 330 to circumvent any "indistinct" categorization to initiate an immediate submission including metadata directed to this type of activity.

Thereafter, the verdict associated with the matching endpoint-stored metadata is determined (see block 455 of FIG. 4B). Where the deduplication logic 330 determines that the verdict is a malicious classification, the agent $135_1$ may report the presence of a malicious event and/or may provide the malicious event (or an object associated with the malicious event) for subsequent malware analysis (see blocks 460-465 of FIG. 4B). However, if the deduplication logic 330 determines that the verdict to be an "unknown" classification, the deduplication logic 330 may submit the monitored event (or an object associated with the monitored event) for subsequent analysis (see blocks 470-475 of FIG. 4B). Lastly, upon determining that the verdict is of a "benign" classification, the deduplication logic 330 may halt further analysis of the monitored event.

When the monitored event is categorized as "distinct," the collected metadata is prepared to be provided to the cybersecurity sensor (see block 480 of FIG. 4B). Furthermore, additional metadata may be optionally collected to accompany the collected metadata when provided to the cybersecurity sensor $120_1$ (see block 485 of FIG. 4B). As described above, the additional metadata may include characteristics of the operating environment from which the collected metadata 150 or other types of metadata that may be useful in providing additional context surrounding the occurrence of the monitored event. The agent-evaluated metadata, namely the collected metadata 150 with the optional additional metadata 152, is provided as a submission to the cybersecurity sensor $120_1$ supporting the endpoint $130_1$ for further analysis (block 490).

V. Cybersecurity Sensor and Communications

A. General Architecture—Cybersecurity Sensor

Figure 5:
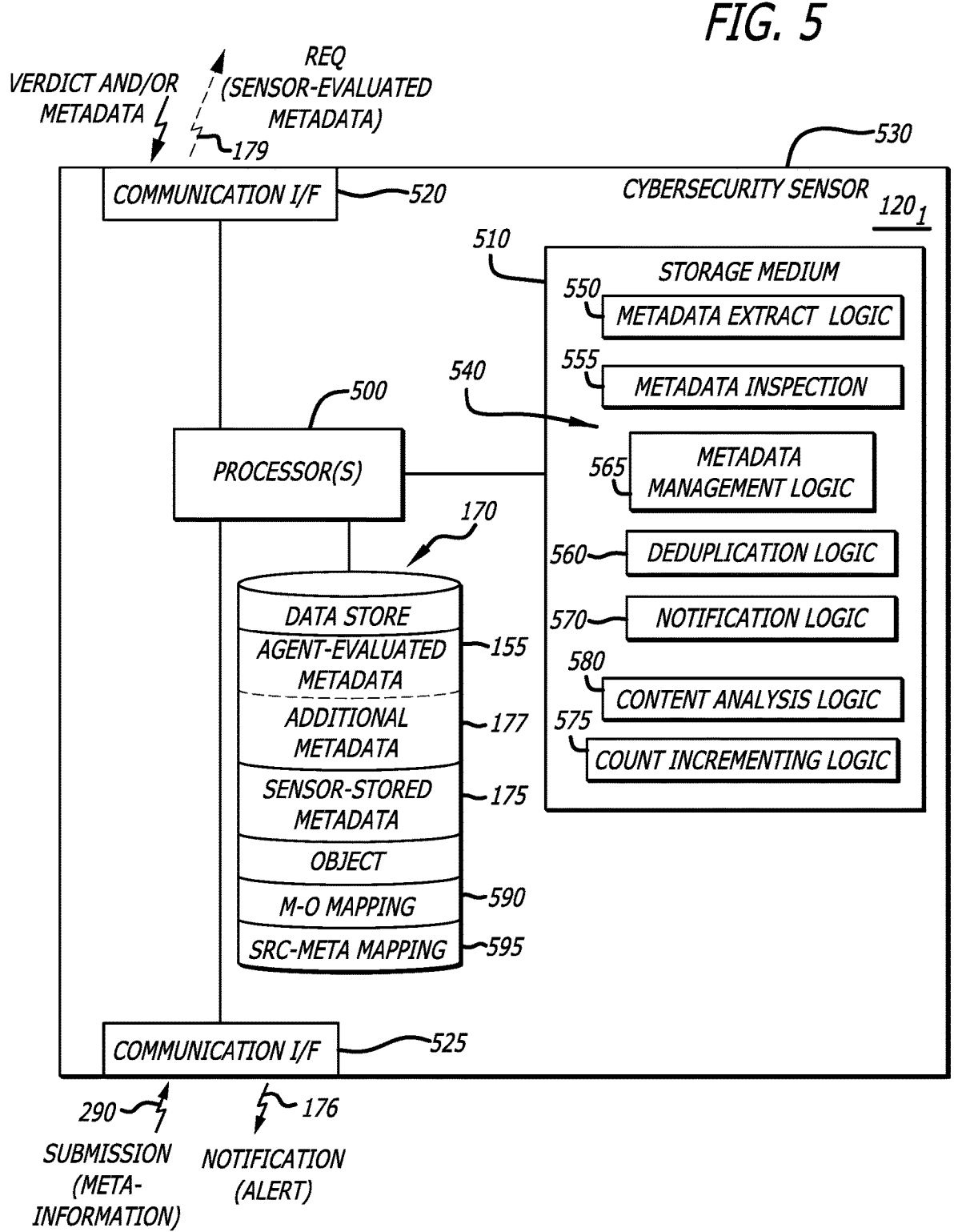
FIG. 5 is an exemplary embodiment of the logical architecture of the cybersecurity sensor of FIG. 1.

Referring now to FIG. 5, an exemplary embodiment of the cybersecurity sensor $120_1$ deployed within the comprehensive cybersecurity platform (CCP) 100 of FIG. 1 is shown. According to one embodiment of the disclosure, the cybersecurity sensor $120_1$ comprises a plurality of components, which include one or more hardware processors 500 (referred to as "processor(s)"), a non-transitory storage medium 510, the second data store 170, and one or more communication interfaces (e.g., interfaces 520 and 525). As illustrated, the cybersecurity sensor $120_1$ is a physical network device, and as such, these components are at least partially encased in a housing 530, which may be made entirely or partially of a rigid material (e.g., hard plastic, metal, glass, composites, or any combination thereof) that protects these components from environmental conditions.

Herein, the hardware processor(s) 500 is a multi-purpose, processing component that is configured to execute logic 540 maintained within the non-transitory storage medium 510 operating as a memory. Operating as a non-volatile memory, the non-transitory storage medium 510 provides storage for the logic 540, which includes metadata extraction logic 550, metadata inspection logic 555, deduplication logic 560, metadata management logic 565, notification logic 570, and/or count incrementing logic 575.

More specifically, executed by the processor(s) 500, the logic 540 is configured to (i) obtain the agent-evaluated metadata 155 from the submission 290 (extraction logic 550); (ii) determine distinctive metadata from the agent-evaluated metadata 155 and collect additional metadata based on processing of the agent-evaluated metadata 155 within the cybersecurity sensor $120_1$ (metadata inspection logic 555); (iii) determine whether a monitored event associated with the distinctive metadata is categorized as "distinct" based on comparison of sensor-stored metadata produced across all endpoints supported by the cybersecurity sensor $120_1$, and thus, should be provided to the cybersecurity intelligence hub 110 of FIG. 1 (deduplication logic 560); (iv) manage storage within the data store 170 (metadata management logic 565); (v) generate and coordinate transmission of alerts upon detection of malicious events and/or objects (notification logic 570); and/or (vi) increment a count associated with one or more entries of the data store 170 including sensor-based metadata that matches the distinctive metadata under analysis (count incrementing logic 575).

As optional logic, the cybersecurity sensor $120_1$ may include a content analysis logic 580 to perform a detailed analysis of the event (or a subsequently fetched object) in an attempt to determine whether the event (or object) is malicious or benign. The operations of the content analysis logic 580 may be performed in parallel with the event analysis operations performed by the logic 540. The content analysis logic 580 may perform the following analyses including, but are not limited or restricted to one or more of the following: static analyses (e.g., anti-virus, anti-spam scanning, pattern matching, heuristics, and/or signature matching), one or more run-time behavioral analyses, and/or one or more event-based inspections using machine-learning models.

Under control by the metadata management logic 565, the data store 170 may be configured to maintain (e.g., store) the sensor-stored metadata uploaded from the plurality of agents $135_1$-$135_3$ as shown or other cybersecurity intelligence downloaded from other sources (including the cybersecurity intelligence hub 110). The data store 170, deployed as non-volatile memory, maintains the sensor-based metadata 175 associated with prior evaluated event by the sensor $120_1$ in accordance with a prescribed storage policy utilized by the data store 170. The data store 170 is further configured to maintain (i) the agent-evaluated metadata 155 received via the submission 290 and (ii) the additional metadata 177 created prior to and/or during operations conducted by the deduplication logic 560.

Additionally, the data store 170 may be configured with one or more mapping tables to maintain relationships between incoming and outgoing data. For instance, one exemplary mapping table may include a metadata-to-object (M-O) mapping table 590 to retain a correspondence between the agent-evaluated metadata 155 and its corresponding object (if requested by the cybersecurity intelligence hub). Another exemplary mapping table may include a source-to-metadata (SRC-Meta) mapping table 595 to retain correspondence between the agent-evaluated metadata 155 and/or sensor-evaluated metadata 179 and its originating source (e.g., IP address of the endpoint $130_1$). It is contemplated that a table should be broadly construed as any storage structure that provides an association between stored data, inclusive of relational databases or the like.

The communication interface 520 may be configured to receive the agent-evaluated metadata 155. For instance, the communication interface 520 may include a network-based connector to receive the submission 290 via a network, and/or an input/output (TO) connector to provide security administrator controlled access to the cybersecurity sensor $120_1$ to update any of the logic 540. Likewise, the communication interface 525 may be configured to provide the sensor-evaluated metadata 179 to the cybersecurity intelligence hub 110 of FIG. 1 and receive verdict and/or metadata (e.g., hub-stored metadata, etc.) from the cybersecurity intelligence hub 110.

In an alternative virtual device deployment, however, the cybersecurity sensor $120_1$ may be implemented entirely as software that may be loaded into a network device and operated in cooperation with an operating system (OS) running on that device. For this implementation, the architecture of the software-based cybersecurity sensor $120_1$ includes software modules that, when executed by the processor, perform functions directed to functionality of logic 540 illustrated within the storage medium 510, as described herein.

B. Cybersecurity Sensor Communications

Figure 6A:
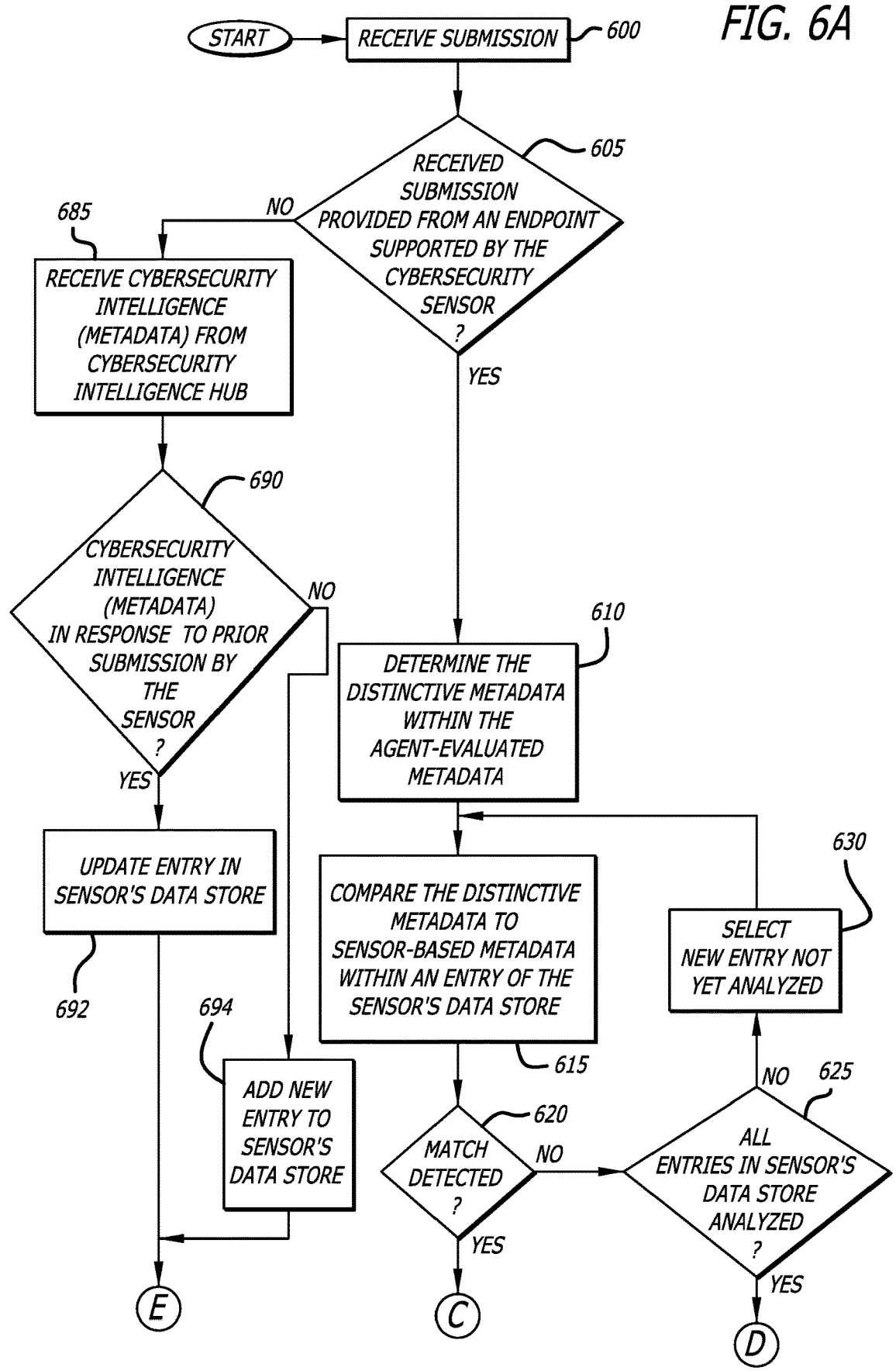
FIGS. 6A-6B are exemplary flowcharts of the operations performed by a cybersecurity sensor in handling a monitored event submission from the endpoint.
Figure 6B:
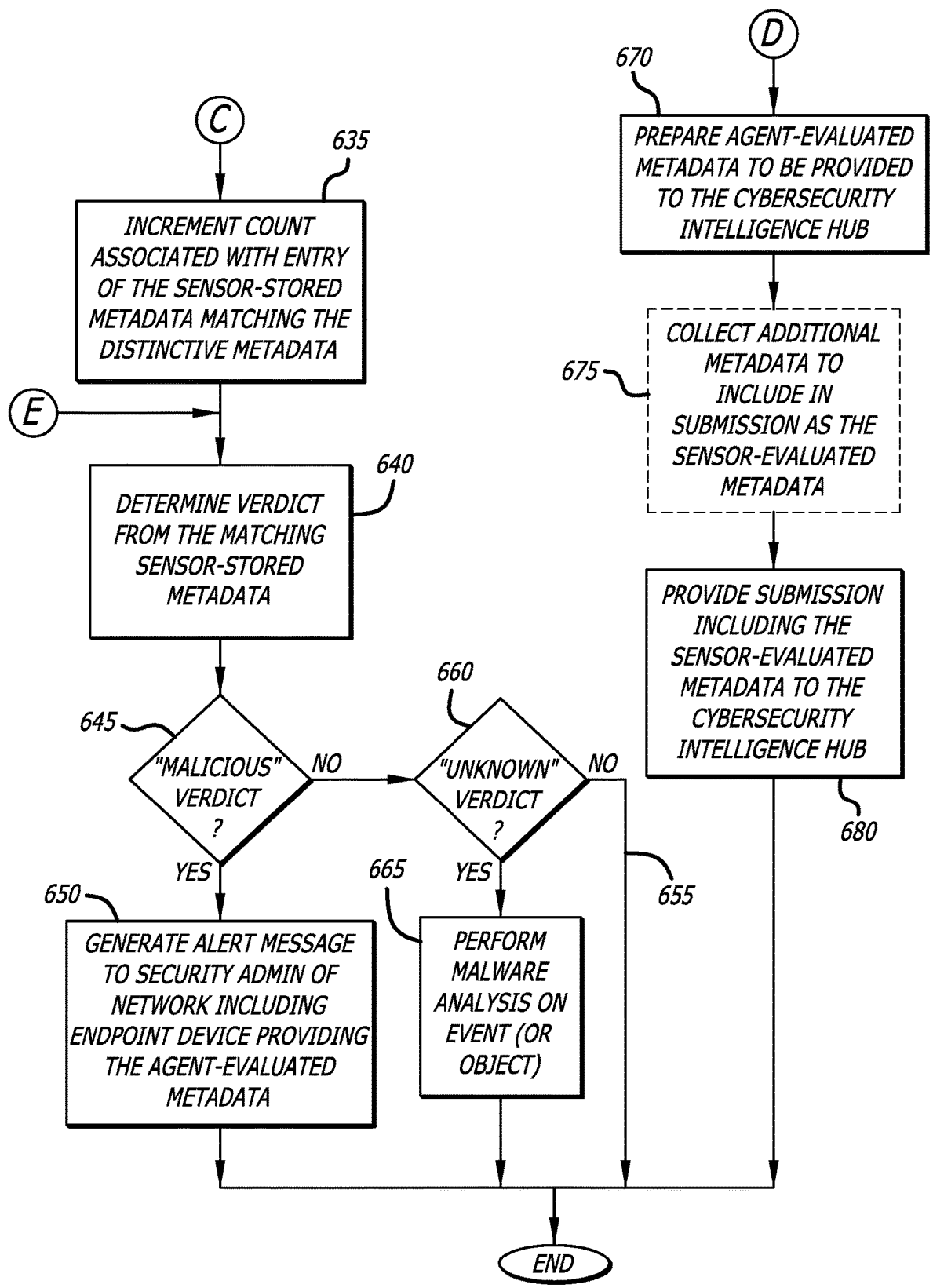

Referring now to FIGS. 6A-6B, an exemplary flowchart of the operations performed by the cybersecurity sensor $120_1$ of FIG. 1 in handling a distinct monitored event submission from the endpoint $130_1$ (referencing the logic of the cybersecurity sensor $120_1$ illustrated in FIG. 5) is shown. After receipt of an incoming submission (metadata extraction logic 550), a determination is made if the submission is provided from either one of a plurality of endpoints supported by the cybersecurity sensor $120_1$ or the cybersecurity intelligence hub 110 (see blocks 600-605 of FIG. 6A). Upon determining that the submission is from an endpoint (e.g., endpoint $130_1$ of FIG. 1), an analysis of the monitored event (represented by the agent-evaluated metadata) is conducted to determine whether or not the monitored event is "distinct." (see blocks 610-630 of FIG. 6A).

According to one embodiment of the disclosure, an analysis of the sensor-stored metadata within the data store is conducted by the metadata inspection logic 555 for a presence of distinctive metadata from the agent-evaluated metadata, taking into account the prescribed storage (caching) policy of the data store. More specifically, a determination is made to identify the distinctive metadata within the agent-evaluated metadata (see block 610 of FIG. 6A). This determination is based, at least in part, on identifying the monitored event type. Thereafter, a comparison is conducted by the deduplication logic 560 between the distinctive metadata (representing the monitored event) and one or more portions of the sensor-stored metadata (see blocks 615-630 of FIG. 6A). This determination may involve comparing the distinctive metadata to one or more portions of the server-stored metadata within an entry of the sensor's data store (see block 615 of FIG. 6A). When a match is not detected, additional comparisons may be performed between portions of the sensor-stored metadata within other entries of the sensor's data store until either a match is detected or sensor-stored metadata within all of the entries of the sensor's data store have been analyzed (see blocks 620-630 of FIG. 6A).

Where a match is detected, a count associated with the entry within the data store storing the matching sensor-based metadata is incremented (see block 635 of FIG. 6B). As stated above, the count may be used to identify a potential cyber-attack, which may prompt providing the sensor-evaluated metadata associated with the repetitive monitored event being received from different agents to the cybersecurity intelligence hub for future analysis.

A verdict associated with the matching sensor-stored metadata is obtained and determined to be the verdict for the monitored event (see block 640 of FIG. 6B). Where the verdict is a "malicious" classification, an alert is generated and issued to one or more security administrators (e.g., security administrator(s) for an enterprise network including the endpoint (see blocks 645 and 650 of FIG. 6B). Herein, the alert includes enriched metadata collected across all of the endpoints supported by the cybersecurity sensor, including the matching portion of the sensor-based metadata, the agent-evaluated metadata and optionally any additional metadata gathered or generated by the cybersecurity sensor and/or cybersecurity intelligence hub that may provide additional context information to the security administrator.

Upon determining that the verdict is of a "benign" classification, the cybersecurity sensor $120_1$ may halt further analysis of the monitored event (see operation 655 of FIG. 6B). However, upon determining that the verdict is an "unknown" classification (see block 660 of FIG. 6B), the cybersecurity sensor $120_1$ may communicate with the cybersecurity intelligence hub to resolve the verdict (e.g., determine if a known verdict (benign, malicious) is currently stored in the global data store or may be obtained by the cybersecurity intelligence hub with assistance from the enrichment services as described below). Additionally, or in the alternative, the cybersecurity sensor may perform malware analyses on at least a portion of the agent-evaluated metadata to determine whether such analyses may enable a definitive classification (malicious or benign) to be set (see block 665 of FIG. 6B).

However, where no match between the distinctive metadata and the sensor-based metadata within the sensor's data store, the agent-evaluated metadata is prepared to be provided to the cybersecurity intelligence hub (see block 670 of FIG. 6B). Furthermore, additional metadata may be collected to accompany the agent-evaluated metadata provided to the cybersecurity intelligence hub (see block 675 of FIG. 6B). As described above, the additional metadata may include characteristics of the operating environment of the cybersecurity sensor $120_1$ along with additional metadata received from other agents that may be useful in providing further additional context surrounding the monitored event. The sensor-evaluated metadata, namely the agent-evaluated metadata 155 with optional additional metadata 177 forming the sensor-evaluated metadata 179, is provided as a submission to the cybersecurity intelligence hub for further analysis (see block 680 of FIG. 6B).

Referring back to FIG. 6A, where the incoming submission is provided from the cybersecurity intelligence hub, a determination is made whether the incoming submission is a response to a prior submission by the sensor such as a submission including sensor-evaluated metadata representing a prior monitored event that was distinct to the sensor (see blocks 685 and 690 of FIG. 6A). If so, the entry within the sensor's data store including the metadata associated with the prior submission is located and updated with metadata provided from the cybersecurity intelligence hub (see block 692 of FIG. 6A). However, where the incoming submission is not a response to a prior submission by the sensor, a new entry is created within the sensor's data store (see block 694 of FIG. 6A). After updating or modifying the sensor's data store, the cybersecurity sensor may conduct an analysis of the returned metadata, including a verdict analysis as illustrated in FIG. 6B.

VI. Cybersecurity Intelligence HUB Communications

Figure 7A:
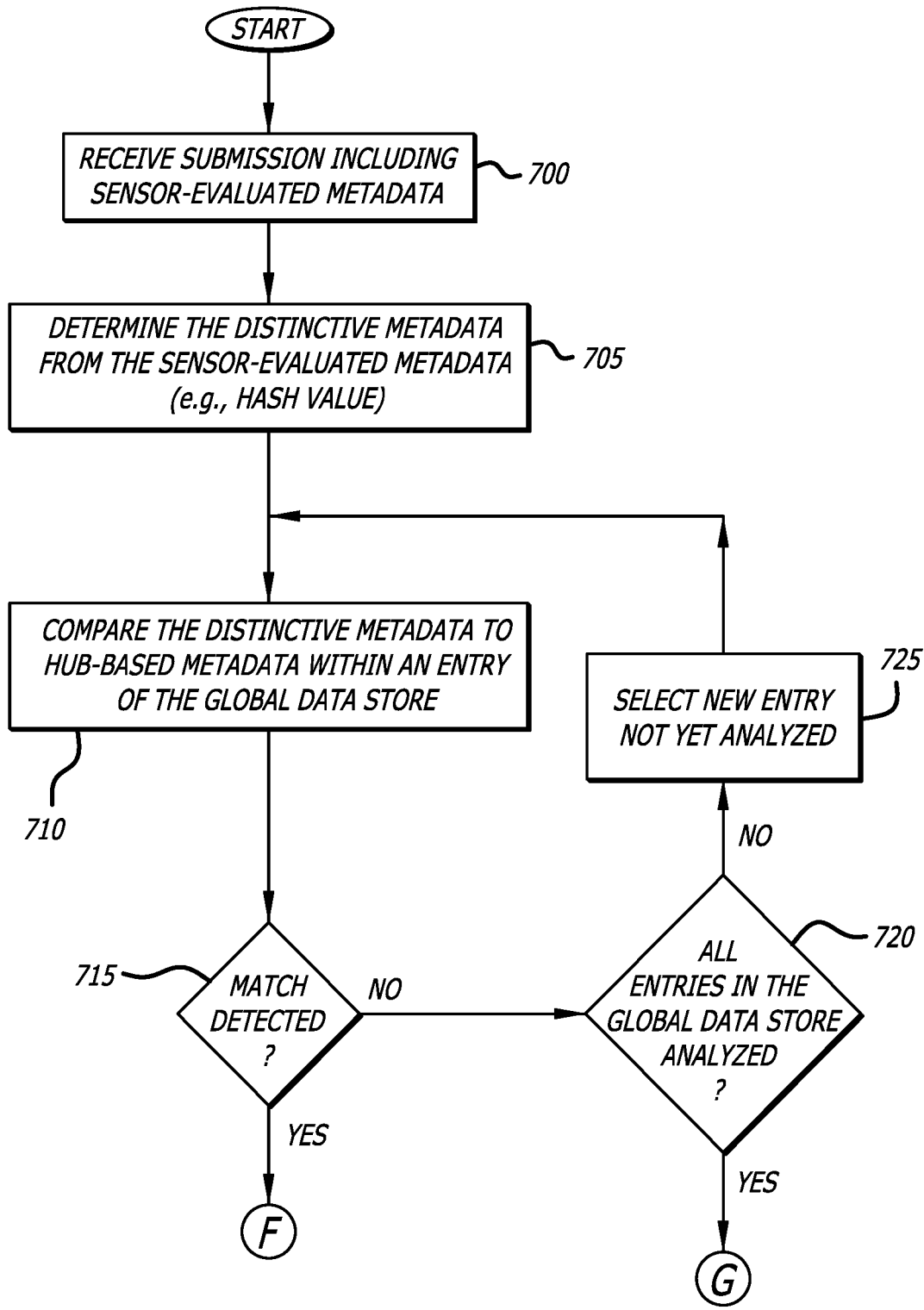
FIGS. 7A-7B are exemplary flowcharts of the operations by the cybersecurity intelligence hub of FIG. 1 during interactions with a cybersecurity sensor.
Figure 7B:
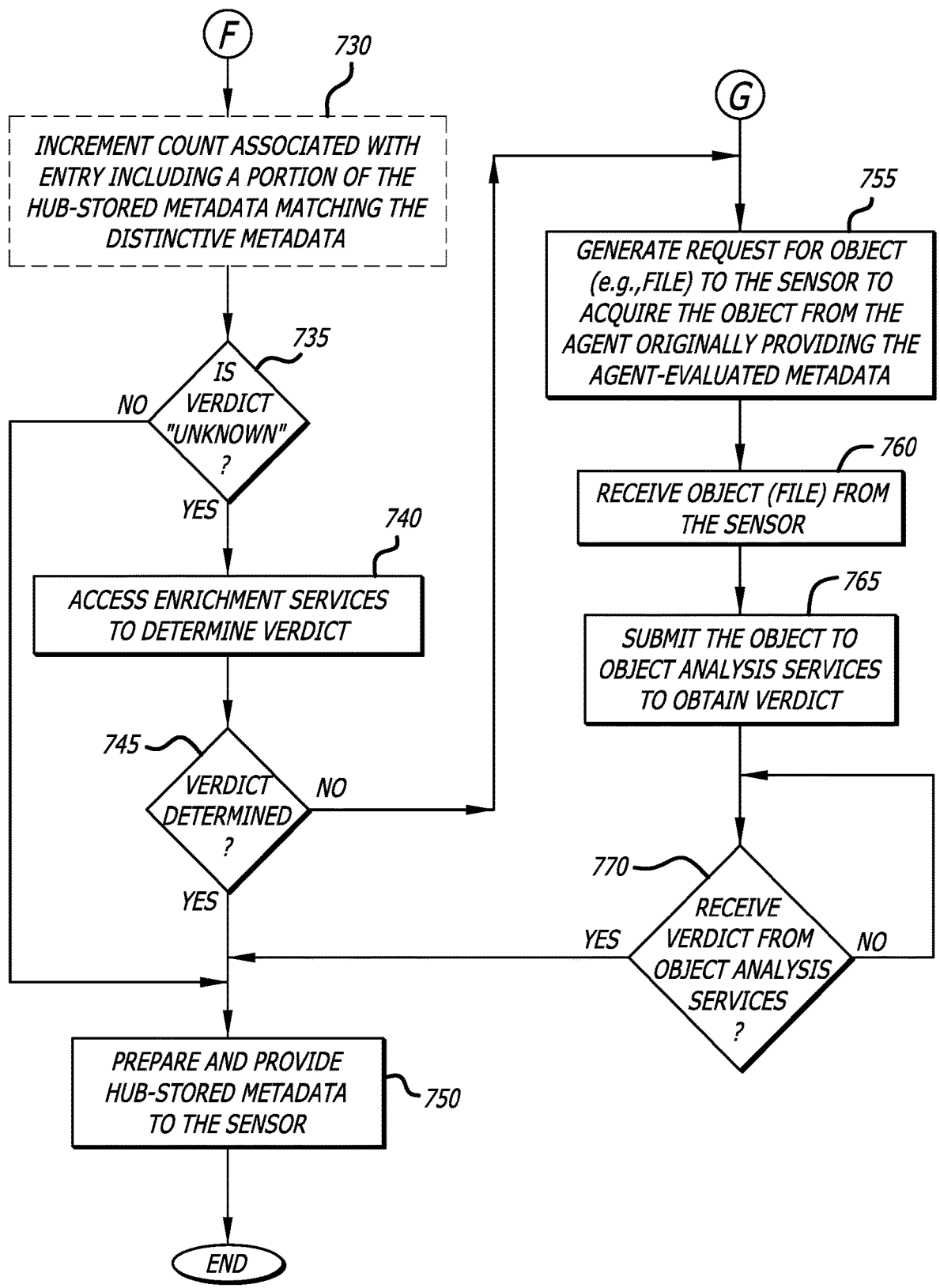

Referring to FIGS. 7A-7B, an exemplary flowchart of the operations performed by the cybersecurity intelligence hub 110 of FIG. 1 during interactions with the cybersecurity sensor $120_1$ is shown. Upon receipt of a submission, an analysis of the monitored event (represented by the sensor-evaluated metadata) is uncover the distinctive metadata (see blocks 700 and 705 of FIG. 7A). More specifically, according to one embodiment of the disclosure, the sensor-based metadata is obtained from the submission and the distinctive metadata is recovered from the sensor-based metadata. Where the monitored event is associated with an object, the distinctive metadata may be a hash value of an object associated with the monitored event. Thereafter, a determination is made (by the DMAE 115 of the cybersecurity intelligence hub 110) whether the distinctive metadata is stored within one or more portions of hub-stored metadata within the global data store (see blocks 715-725 of FIG. 7A). This determination may involve an iterative comparison of the distinctive metadata to portions of the hub-stored metadata within entries of the global data store 180 to determine if a match is detected.

In response to a match being detected from this comparison, where the global data store is deployed with a similar count-monitoring scheme described above and optionally deployed within the endpoint $130_1$ and/or cybersecurity sensor $120_1$ of FIG. 1, a count associated with the entry within the global data store storing the matching hub-based metadata may be incremented (see block 730 of FIG. 7B). Thereafter, the verdict associated with the matching sensor-stored metadata is determined (see block 735 of FIG. 7B). Where the verdict is determined to be a "unknown" classification, the DMAE 115 accesses the enrichment services (see block 740 of FIG. 7B) in efforts to determine whether such resources identifies a verdict for the monitored event (see block 745 of FIG. 7B). If so, the entry of the global data store is updated and the hub-stored metadata is provided to the requesting cybersecurity sensor (see block 750 of FIG. 7B).

However, in response to the distinctive metadata failing to match the hub-stored metadata or the DMAE being unable to secure an updated verdict for an entry with a currently unknown verdict, the DMAE generates a request for an object associated with the monitored event (e.g., file) and issues a request message to the requesting cybersecurity sensor to acquire the object from the agent that originated the agent-evaluated metadata used in forming the sensor-evaluated metadata provided to the cybersecurity intelligence hub (see blocks 755 and 760 of FIG. 7B). Upon receipt of the object, the DMAE submits the object to the object analysis services to analyze and return a verdict associated with the object (see blocks 765 and 770 of FIG. 7B). Upon receipt of the verdict, the entry of the global data store is updated and the hub-stored metadata is provided to the requesting cybersecurity sensor (see block 750 of FIG. 7B).

In the foregoing description, the invention is described with reference to specific exemplary embodiments thereof. However, it will be evident that various modifications and changes may be made thereto without departing from the broader spirit and scope of the invention as set forth in the appended claims. For example, while the invention has been described in conjunction with a cybersecurity mechanism, these principles can also be used in any analysis of large volumes of data in which a verdict is sought such as characterizing the data. In conjunction, while the case has been described in terms of verdicts, other verdicts within the cybersecurity field are possible such as cyber-attack type, etc.

What is claimed is:

1. An endpoint comprising:
one or more processors; and
a non-transitory storage medium coupled to the one or more processors, the non-transitory storage medium comprises an agent stored within the non-transitory storage medium and executed by the one or more processors, the agent including
(i) event monitoring logic that, when executed by the one or more processors, monitors for one or more types of events being performed on the endpoint,
(ii) metadata logic that, when executed by the one or more processors, is configured to collect metadata associated with a monitored event of the one or more event types being monitored,
(iii) timestamp generation logic configured to generate a timestamp associated with detection of the monitored event and the timestamp being stored as part of the collected metadata,
(iv) deduplication logic that, when executed by the one or more processors, is configured to conduct a first determination as to whether the monitored event is distinct among events monitored by the event monitoring logic by at least comparing a portion of the collected metadata to prior collected metadata, and
(v) count incrementing logic, when executed by the one or more processors and responsive to the deduplication logic determining that the portion of the collected metadata matches a corresponding portion of metadata associated with the monitored event, is configured to set a count identifying a number of occurrences of the monitored event that can prompt the deduplication logic to categorize the monitored event as distinct,
wherein, when the monitored event is categorized as distinct, the deduplication logic to provide at least the portion of the collected metadata to a cybersecurity sensor to conduct a second determination as to whether the monitored event is distinct across events being monitored by a plurality of endpoints including the endpoint.

2. The endpoint of claim 1, wherein the deduplication logic of the agent is configured to conduct the first determination that includes comparing the portion of the collected metadata to metadata associated with events monitored by the event monitoring logic including the corresponding portion of metadata, the monitored event being categorized as distinct when a level of correlation between the portion of the collected metadata to the corresponding portion of metadata falls below a prescribed correlation threshold.

3. The endpoint of claim 2, wherein the portion of the collected metadata comprises an identifier of an object being referenced by a process executed by the endpoint and a path identifying a storage location of the object.

4. The endpoint of claim 3, wherein responsive to the agent detecting the monitored event being a network connection attempted by the endpoint, the portion of the collected metadata comprises a destination address associated with the network connection, a source address associated with the network connection, and a destination port associated with the network connection.

5. The endpoint of claim 1, wherein the deduplication logic, upon detecting that a number of occurrences of the monitored event exceeding a prescribed threshold during a prescribed time window, is configured to determine that the monitored event is distinct regardless of a presence of the portion of the metadata representing that a prior evaluated event corresponding to the monitored event has been previously detected.

6. The endpoint of claim 1, wherein the agent being configured to provide additional metadata associated with the monitored event to accompany the collected metadata being provided to the cybersecurity sensor, the additional metadata including characteristics of an operating environment of the endpoint.

7. The endpoint of claim 1 being communicatively coupled to the cybersecurity sensor, the cybersecurity sensor comprises (i) a data store, (ii) metadata inspection logic to determine distinctive metadata being a portion of the collected metadata, representing the monitored event and distinguishing the endpoint from remaining endpoints of the plurality of endpoints, and (iii) a second deduplication logic to (a) determine whether the monitored event associated with the distinctive metadata is categorized as distinct based on metadata associated with events being monitored by all of the plurality of endpoints, and (b) provide at least the collected metadata to a cybersecurity intelligence hub upon determining that the monitored event is distinct across the plurality of endpoints while refraining from providing the collected metadata to the cybersecurity intelligence hub unless the monitored event is determined to be distinct, the cybersecurity intelligence hub classifies the monitored event as malicious or benign.

8. The endpoint of claim 1 being communicatively coupled to the cybersecurity sensor, the cybersecurity sensor comprises (i) a data store, and (ii) a second deduplication logic to (a) determine whether the monitored event associated with the distinctive metadata is categorized as distinct across events being monitored and detected by the one or more endpoints and stored within the data store, and (b) return a verdict to the first endpoint upon detecting, by the cybersecurity sensor, that the portion of the collected metadata matches a portion of the metadata associated with a prior evaluated event corresponding to the monitored event being stored within the data store, the verdict being part of the portion of the metadata stored within the local data store and representing a classification for the monitored event.

9. The endpoint of claim 8, wherein the verdict being one of a malicious classification or a benign classification.

10. The endpoint of claim 1 being communicatively coupled to the cybersecurity sensor, the cybersecurity sensor comprises notification logic to issue an alert in response to (i) detecting that metadata, provided from the agent and including the collected metadata, matches a portion of the metadata associated with a prior evaluated event that is received from the plurality of endpoints other than the endpoint and (ii) determining that the portion of the metadata includes data that classifies the prior evaluated event as a malicious event.

11. The endpoint of claim 10, wherein the alert being configured to initiate another remediation technique or conduct additional analytics on the metadata.

12. An endpoint comprising:
one or more processors; and
a non-transitory storage medium coupled to the one or more processors, the non-transitory storage medium comprises an agent, the agent including
  (i) event monitoring logic that, when executed by the one or more processors, monitors for one or more types of events being performed on the endpoint,
  (ii) metadata logic that, when executed by the one or more processors, is configured to collect metadata associated with a monitored event of the one or more event types being monitored,
  (iii) deduplication logic that, when executed by the one or more processors, is configured to conduct a first determination as to whether the monitored event is distinct among events monitored by the event monitoring logic by at least comparing a portion of the collected metadata to prior collected metadata, wherein the deduplication logic, upon detecting that a number of occurrences of the monitored event exceeding a prescribed threshold during a prescribed time window, is configured to determine that the monitored event is distinct regardless of a presence of the portion of the metadata representing that a prior evaluated event corresponding to the monitored event has been previously detected, and
  (iv) count incrementing logic, when executed by the one or more processors and responsive to the deduplication logic determining that the portion of the collected metadata matches a corresponding portion of metadata associated with the monitored event, is configured to set a count identifying a number of occurrences of the monitored event that can prompt the deduplication logic to categorize the monitored event as distinct,
wherein, when the monitored event is categorized as distinct, the deduplication logic to provide at least the portion of the collected metadata to a cybersecurity sensor to conduct a second determination as to whether the monitored event is distinct across events being monitored by a plurality of endpoints including the endpoint.

13. The endpoint of claim 12, wherein the deduplication logic of the agent is configured to conduct the first determination that includes comparing the portion of the collected metadata to metadata associated with events monitored by the event monitoring logic including the corresponding portion of metadata, the monitored event being categorized as distinct when a level of correlation between the portion of the collected metadata to the corresponding portion of metadata falls below a prescribed correlation threshold.

14. The endpoint of claim 13, wherein the portion of the collected metadata comprises an identifier of an object being referenced by a process executed by the endpoint and a path identifying a storage location of the object.

15. The endpoint of claim 14, wherein responsive to the agent detecting the monitored event being a network connection attempted by the endpoint, the portion of the collected metadata comprises a destination address associated with the network connection, a source address associated with the network connection, and a destination port associated with the network connection.

16. The endpoint of claim 12, wherein the agent stored within the non-transitory storage medium and executed by the one or more processors, further comprising:
timestamp generation logic configured to generate a timestamp associated with detection of the monitored event and the timestamp being stored as part of the collected metadata.

17. The endpoint of claim 12, wherein the agent being configured to provide additional metadata associated with the monitored event to accompany the collected metadata being provided to the cybersecurity sensor, the additional metadata including characteristics of an operating environment of the endpoint.

18. The endpoint of claim 12 being communicatively coupled to the cybersecurity sensor, the cybersecurity sensor comprises (i) a data store, (ii) metadata inspection logic to determine distinctive metadata being a portion of the collected metadata, representing the monitored event and distinguishing the endpoint from remaining endpoints of the plurality of endpoints, and (iii) a second deduplication logic to (a) determine whether the monitored event associated with the distinctive metadata is categorized as distinct based on metadata associated with events being monitored by all of the plurality of endpoints, and (b) provide at least the collected metadata to a cybersecurity intelligence hub upon determining that the monitored event is distinct across the plurality of endpoints while refraining from providing the collected metadata to the cybersecurity intelligence hub unless the monitored event is determined to be distinct, the cybersecurity intelligence hub classifies the monitored event as malicious or benign.

19. The endpoint of claim 12 being communicatively coupled to the cybersecurity sensor, the cybersecurity sensor comprises (i) a data store, and (ii) a second deduplication logic to (a) determine whether the monitored event associated with the distinctive metadata is categorized as distinct across events being monitored and detected by the one or more endpoints and stored within the data store, and (b) return a verdict to the first endpoint upon detecting, by the cybersecurity sensor, that the portion of the collected metadata matches a portion of the metadata associated with a prior evaluated event corresponding to the monitored event being stored within the data store, the verdict being part of the portion of the metadata stored within the local data store and representing a classification for the monitored event.

20. The endpoint of claim 12 being communicatively coupled to the cybersecurity sensor, the cybersecurity sensor comprises notification logic to issue an alert in response to (i) detecting that metadata, provided from the agent and including the collected metadata, matches a portion of the metadata associated with a prior evaluated event that is received from the plurality of endpoints other than the endpoint and (ii) determining that the portion of the metadata includes data that classifies the prior evaluated event as a malicious event.

* * * * *